United States Patent
Nishida et al.

(10) Patent No.: US 11,392,050 B2
(45) Date of Patent: Jul. 19, 2022

(54) PROCESS CARTRIDGE AND ELECTROPHOTOGRAPHIC APPARATUS

(71) Applicant: CANON KABUSHIKI KAISHA, Tokyo (JP)

(72) Inventors: Tsutomu Nishida, Mishima (JP); Yuka Ishiduka, Suntou-gun (JP); Kenichi Kaku, Suntou-gun (JP); Nobuhiro Nakamura, Numazu (JP); Hiroyuki Watanabe, Suntou-gun (JP); Hideharu Shimozawa, Numazu (JP); Atsushi Okuda, Yokohama (JP); Yuichi Kikuchi, Suntou-gun (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 17/069,919

(22) Filed: Oct. 14, 2020

(65) Prior Publication Data

US 2021/0116826 A1 Apr. 22, 2021

(30) Foreign Application Priority Data

Oct. 18, 2019 (JP) .............................. JP2019-191563

(51) Int. Cl.
*G03G 5/147* (2006.01)
*G03G 15/00* (2006.01)
(Continued)

(52) U.S. Cl.
CPC .............. *G03G 5/104* (2013.01); *C08K 3/04* (2013.01); *C08K 3/26* (2013.01); *C08L 19/00* (2013.01);
(Continued)

(58) Field of Classification Search
CPC ............... G03G 5/104; G03G 5/14704; G03G 5/14795; G03G 15/0233; G03G 15/751;
(Continued)

(56) References Cited

U.S. PATENT DOCUMENTS 6,697,587 B2 2/2004 Harada
6,991,881 B2 1/2006 Ogaki et al.
(Continued)

FOREIGN PATENT DOCUMENTS

JP 2002-003651 A 1/2002
JP 2005-092134 A 4/2005
(Continued)

OTHER PUBLICATIONS

U.S. Appl. No. 17/065,258, Kohei Makisumi, filed Oct. 7, 2020.
(Continued)

*Primary Examiner* — Sophia S Chen
(74) *Attorney, Agent, or Firm* — Venable LLP

(57) ABSTRACT

A process cartridge which allows any spot and stripe as image defects to be suppressed is provided. A process cartridge, in which an electroconductive layer of a charging member has a matrix including a first rubber, and domains dispersed in the matrix, the domains include a second rubber and an electron electroconductive agent, at least some of the domains are exposed on a surface of the charging member, when a volume resistivity of the matrix is $10^5$ times or more a volume resistivity of the domains, a protective layer of an electrophotographic photosensitive member includes a metal oxide particle, and when a number average primary particle size of the metal oxide particle is defined as Sm and an average value of equivalent circle diameters of the domains is defined as Sd, the Sd/Sm satisfies the following expression (1): $0.5 < Sd/Sm < 100$ . . . expression (1).

8 Claims, 2 Drawing Sheets

(51) Int. Cl.
*G03G 15/02* (2006.01)
*G03G 5/10* (2006.01)
*C08K 3/04* (2006.01)
*C08L 19/00* (2006.01)
*G03G 21/18* (2006.01)
*C08K 3/26* (2006.01)

(52) U.S. Cl.
CPC ..... *G03G 5/14704* (2013.01); *G03G 15/0233* (2013.01); *G03G 15/751* (2013.01); *G03G 21/1814* (2013.01); *C08K 2003/265* (2013.01); *C08K 2201/001* (2013.01)

(58) Field of Classification Search
CPC ............. G03G 15/752; G03G 21/0094; G03G 21/1814; C08K 3/04; C08K 3/26; C08K 2003/2231; C08K 2003/265; C08K 2201/005; C08L 9/06; C08L 19/00
See application file for complete search history.

(56) References Cited

U.S. PATENT DOCUMENTS

| | | |
|---|---|---|
| 6,994,941 B2 | 2/2006 | Tanaka et al. |
| 7,001,699 B2 | 2/2006 | Tanaka et al. |
| 7,045,261 B2 | 3/2006 | Tanaka et al. |
| 7,585,604 B2 | 9/2009 | Ogaki et al. |
| 7,645,547 B2 | 1/2010 | Okuda et al. |
| 7,655,370 B2 | 2/2010 | Kitamura et al. |
| 7,910,274 B2 | 3/2011 | Tanaka et al. |
| 7,927,774 B2 | 4/2011 | Ogaki et al. |
| 8,088,541 B2 | 1/2012 | Tanaka et al. |
| 8,298,670 B2 | 10/2012 | Muranaka et al. |
| 8,449,975 B2 | 5/2013 | Hirakoso et al. |
| 8,455,170 B2 | 6/2013 | Nakamura et al. |
| 8,481,236 B2 | 7/2013 | Tanaka et al. |
| 8,557,486 B2 | 10/2013 | Ishida et al. |
| 8,628,854 B2 | 1/2014 | Yamauchi et al. |
| 8,632,935 B2 | 1/2014 | Sugiyama et al. |
| 8,668,987 B2 | 3/2014 | Yamauchi et al. |
| 8,669,027 B2 | 3/2014 | Anezaki et al. |
| 8,715,830 B2 | 5/2014 | Yamada et al. |
| 8,753,789 B2 | 6/2014 | Ogaki et al. |
| 8,765,335 B2 | 7/2014 | Tanaka et al. |
| 8,771,818 B2 | 7/2014 | Nishioka et al. |
| 8,783,209 B2 | 7/2014 | Kaku et al. |
| 8,815,479 B2 | 8/2014 | Shida et al. |
| 8,846,281 B2 | 9/2014 | Okuda et al. |
| 8,852,743 B2 | 10/2014 | Kikuchi et al. |
| 8,865,381 B2 | 10/2014 | Tanaka et al. |
| 8,921,020 B2 | 12/2014 | Murai et al. |
| 8,980,508 B2 | 3/2015 | Okuda et al. |
| 8,980,509 B2 | 3/2015 | Noguchi et al. |
| 9,023,465 B2 | 5/2015 | Yamada et al. |
| 9,029,054 B2 | 5/2015 | Okuda et al. |
| 9,040,214 B2 | 5/2015 | Fujii et al. |
| 9,046,797 B2 | 6/2015 | Fujii et al. |
| 9,063,505 B2 | 6/2015 | Sekiya et al. |
| 9,069,267 B2 | 6/2015 | Kaku et al. |
| 9,086,643 B2 | 7/2015 | Kikuchi et al. |
| 9,114,565 B2 | 8/2015 | Kawai et al. |
| 9,128,403 B2 | 9/2015 | Yamauchi et al. |
| 9,146,482 B2 | 9/2015 | Watanabe et al. |
| 9,170,506 B2 | 10/2015 | Tanaka et al. |
| 9,170,507 B2 | 10/2015 | Sugiyama et al. |
| 9,188,888 B2 | 11/2015 | Okuda et al. |
| 9,207,550 B2 | 12/2015 | Okuda et al. |
| 9,256,145 B2 | 2/2016 | Fujii et al. |
| 9,280,071 B2 | 3/2016 | Maruyama et al. |
| 9,280,072 B2 | 3/2016 | Ogaki et al. |
| 9,282,615 B2 | 3/2016 | Yamagishi et al. |
| 9,304,416 B2 | 4/2016 | Noguchi et al. |
| 9,341,964 B2 | 5/2016 | Ogaki et al. |
| 9,360,789 B1 | 6/2016 | Masu et al. |
| 9,372,417 B2 | 6/2016 | Fujii et al. |
| 9,372,418 B2 | 6/2016 | Shida et al. |
| 9,372,419 B2 | 6/2016 | Tsuji et al. |
| 9,436,106 B2 | 9/2016 | Kuno et al. |
| 9,436,107 B2 | 9/2016 | Murakami et al. |
| 9,442,408 B2 | 9/2016 | Yamauchi et al. |
| 9,442,451 B2 | 9/2016 | Yamauchi et al. |
| 9,459,545 B2 | 10/2016 | Tanaka et al. |
| 9,523,929 B2 | 12/2016 | Nakamura et al. |
| 9,535,346 B2 | 1/2017 | Sekiya et al. |
| 9,541,850 B2 | 1/2017 | Nishida et al. |
| 9,541,854 B2 | 1/2017 | Kikuchi et al. |
| 9,547,250 B2 | 1/2017 | Kikuchi et al. |
| 9,551,949 B2 | 1/2017 | Yamauchi et al. |
| 9,563,139 B2 | 2/2017 | Kawahara et al. |
| 9,575,422 B2 | 2/2017 | Okuda et al. |
| 9,581,931 B2 | 2/2017 | Yamada et al. |
| 9,599,913 B2 | 3/2017 | Nishioka et al. |
| 9,599,915 B2 | 3/2017 | Anezaki et al. |
| 9,599,917 B2 | 3/2017 | Okuda et al. |
| 9,639,009 B2 | 5/2017 | Yamaguchi et al. |
| 9,645,515 B2 | 5/2017 | Kuno et al. |
| 9,645,516 B2 | 5/2017 | Kawahara et al. |
| 9,651,888 B2 | 5/2017 | Muranaka et al. |
| 9,665,028 B2 | 5/2017 | Arimura et al. |
| 9,665,029 B2 | 5/2017 | Hino et al. |
| 9,684,277 B2 | 6/2017 | Yamamoto et al. |
| 9,726,992 B2 | 8/2017 | Sakuma et al. |
| 9,740,133 B2 | 8/2017 | Yamauchi et al. |
| 9,772,596 B2 | 9/2017 | Mitsui et al. |
| 9,791,792 B2 | 10/2017 | Miyauchi et al. |
| 9,811,009 B2 | 11/2017 | Yamada et al. |
| 9,811,021 B2 | 11/2017 | Muranaka et al. |
| 9,869,032 B2 | 1/2018 | Kawahara et al. |
| 9,897,931 B2 | 2/2018 | Nishioka et al. |
| 9,958,802 B2 | 5/2018 | Kikuchi et al. |
| 9,964,914 B2 | 5/2018 | Arimura et al. |
| 9,977,353 B2 | 5/2018 | Nishioka et al. |
| 10,018,927 B2 | 7/2018 | Yamada et al. |
| 10,018,934 B2 | 7/2018 | Yamada et al. |
| 10,073,362 B2 | 9/2018 | Fujii et al. |
| 10,108,129 B2 | 10/2018 | Yamaguchi et al. |
| 10,162,278 B2 | 12/2018 | Kuno et al. |
| 10,203,617 B2 | 2/2019 | Kuno et al. |
| 10,280,148 B2 | 5/2019 | Nishioka et al. |
| 10,303,085 B2 | 5/2019 | Sato et al. |
| 10,372,050 B2 | 8/2019 | Nishi et al. |
| 10,416,581 B2 | 9/2019 | Ito et al. |
| 10,416,588 B2 | 9/2019 | Masu et al. |
| 10,539,892 B2 | 1/2020 | Nishida et al. |
| 10,558,132 B2 | 2/2020 | Ishiduka et al. |
| 10,558,133 B2 | 2/2020 | Nakamura et al. |
| 10,642,177 B2 | 5/2020 | Nakamura et al. |
| 10,649,350 B2 | 5/2020 | Yamaguchi et al. |
| 10,678,154 B2 | 6/2020 | Takashima et al. |
| 10,678,158 B2 | 6/2020 | Kikuchi et al. |
| 10,691,033 B2 | 6/2020 | Nishida et al. |
| 10,747,130 B2 | 8/2020 | Okuda et al. |
| 10,747,131 B2 | 8/2020 | Watanabe et al. |
| 10,838,315 B2 | 11/2020 | Shimozawa et al. |
| 2004/0105983 A1* | 6/2004 | Hattori .................... B29C 48/34 428/421 |
| 2004/0142179 A1* | 7/2004 | Harada ............... G03G 15/0233 428/413 |
| 2012/0308261 A1 | 12/2012 | Tsuru et al. |
| 2013/0281276 A1 | 10/2013 | Watanabe et al. |
| 2014/0004450 A1 | 1/2014 | Tokimitsu et al. |
| 2014/0093281 A1 | 4/2014 | Takahashi et al. |
| 2015/0185630 A1 | 7/2015 | Ito et al. |
| 2015/0185634 A1 | 7/2015 | Sekiya et al. |
| 2015/0316863 A1 | 11/2015 | Tanaka et al. |
| 2015/0331346 A1 | 11/2015 | Yamauchi et al. |
| 2015/0346617 A1 | 12/2015 | Kawahara et al. |
| 2015/0362847 A1 | 12/2015 | Tanaka et al. |
| 2016/0091807 A1 | 3/2016 | Tanaka et al. |
| 2016/0131985 A1 | 5/2016 | Tanaka et al. |
| 2017/0060008 A1 | 3/2017 | Okuda et al. |
| 2019/0369514 A1 | 12/2019 | Watanabe et al. |
| 2019/0369529 A1 | 12/2019 | Yagi et al. |
| 2020/0264526 A1 | 8/2020 | Shimozawa et al. |

(56) References Cited

U.S. PATENT DOCUMENTS

| | | |
|---|---|---|
| 2020/0292949 A1 | 9/2020 | Ishiduka et al. |
| 2020/0310264 A1 | 10/2020 | Kurachi et al. |
| 2020/0310265 A1 | 10/2020 | Nishioka et al. |
| 2020/0310266 A1 | 10/2020 | Kikuchi et al. |
| 2021/0026295 A1 | 1/2021 | Yamada et al. |
| 2021/0033996 A1 | 2/2021 | Kikuchi et al. |

FOREIGN PATENT DOCUMENTS

| | | |
|---|---|---|
| JP | 2010-152338 A | 7/2010 |
| JP | 2017-126034 A | 7/2017 |

OTHER PUBLICATIONS

U.S. Appl. No. 17/070,054, Yuka Ishiduka, filed Oct. 14, 2020.
U.S. Appl. No. 17/070,085, Fumiyuki Hiyama, filed Oct. 14, 2020.
U.S. Appl. No. 17/070,179, Kaname Watariguchi, filed Oct. 14, 2020.
U.S. Appl. No. 17/071,103, Noriyoshi Umeda, filed Oct. 15, 2020.
U.S. Appl. No. 17/071,109, Shohei Kototani, filed Oct. 15, 2020.
U.S. Appl. No. 17/071,227, Kosuke Fukudome, filed Oct. 15, 2020.
U.S. Appl. No. 17/071,246, Tomohiro Unno, filed Oct. 15, 2020.
U.S. Appl. No. 17/071,283, Yoshitaka Suzumura, filed Oct. 15, 2020.
U.S. Appl. No. 17/071,535, Hiroyuki Tomono, filed Oct. 15, 2020.
U.S. Appl. No. 17/071,540, Tsuneyoshi Tominaga, filed Oct. 15, 2020.
U.S. Appl. No. 17/072,206, Satoru Nishioka, filed Oct. 16, 2020.

* cited by examiner

PROCESS CARTRIDGE AND ELECTROPHOTOGRAPHIC APPARATUS

BACKGROUND OF THE INVENTION

Field of the Invention

The present disclosure is directed to a process cartridge and an electrophotographic apparatus.

Description of the Related Art

Electrophotographic apparatuses or process cartridges have been heretofore widely studied for suppression of deterioration in image quality in long-term use.

Japanese Patent Application Laid-Open No. 2002-003651 discloses a rubber composition having a sea-island structure including a polymer continuous phase including an ion conductive rubber material mainly including raw material rubber A having a volume specific resistivity of $1 \times 10^{12}$ Ω·cm or less and a polymer particle phase including an electron conductive rubber material obtained by compounding an electroconducting particle into raw material rubber B and making the resulting compound electroconductive, and a charging member having an elastic layer formed from the rubber composition.

Japanese Patent Application Laid-Open No. 2010-152338 describes an electrophotographic photosensitive member which is improved in wear resistance to the same level as in an amorphous silicon photosensitive member by forming a protective layer due to a reaction of a tin oxide particle having a reactive acryloyl group or methacryloyl group with a curable monomer. The Literature further describes the electrophotographic photosensitive member which is improved with respect to image deletion and image blurring easily caused under a high-temperature and high-humidity environment or the like and which allows an image high in durability and high in image quality to be obtained.

According to studies of the present inventors, the process cartridge and the electrophotographic apparatus, described in Japanese Patent Application Laid-Open No. 2002-003651 and Japanese Patent Application Laid-Open No. 2010-152338, have room for improvement with respect to the occurrence of any spot and stripe in long-term use.

SUMMARY OF THE INVENTION

One aspect of the present disclosure is directed to providing an electrophotographic apparatus and a process cartridge which can allow the occurrence of any spot and stripe to be suppressed even in long-term use.

According to one aspect of the present disclosure, a process cartridge detachably attachable to an electrophotographic apparatus body, including an electrophotographic photosensitive member and a charging member, is provided, wherein the charging member includes a support having an electroconductive outer surface and an electroconductive layer provided on the outer surface of the support, the electroconductive layer has a matrix including a first rubber, and a plurality of domains dispersed in the matrix, the domains include a second rubber and an electron electroconductive agent, at least some of the domains are exposed on an outer surface of the charging member, the outer surface of the charging member is constituted by at least the matrix and at least some of the domains, when a volume resistivity of the matrix is defined as Rcm and a volume resistivity of the domains is defined as Rcd, the Rcm is $1.0 \times 10^5$ times or more the Rcd, the electrophotographic photosensitive member includes a support, a photosensitive layer and a protective layer in the order listed, the protective layer includes a metal oxide particle, and when a number average primary particle size of the metal oxide particle is defined as Sm and an average value of equivalent circle diameters of the domains, as observed from the outer surface of the charging member, is defined as Sd, the Sd/Sm satisfies the following expression (1):

$$0.5 < Sd/Sm < 100 \qquad \text{expression (1).}$$

According to another aspect of the present disclosure, an electrophotographic apparatus including the above electrophotographic photosensitive member and the charging member is provided.

According to one aspect of the present disclosure, a process cartridge and an electrophotographic apparatus which allow the occurrence of any spot and stripe to be suppressed even in long-term use can be obtained.

Further features of the present invention will become apparent from the following description of exemplary embodiments with reference to the attached drawings.

DESCRIPTION OF THE EMBODIMENTS

Figure 1:
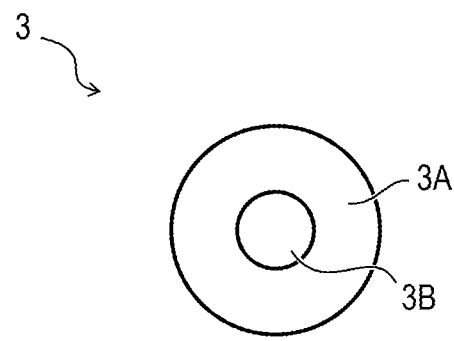
FIG. 1 illustrates a cross-sectional view perpendicular to a longitudinal direction of an electroconductive roller 1.

An electrophotographic apparatus adopting a so-called contact charging system, which charges an electrophotographic photosensitive member (hereinafter, simply referred to as "photosensitive member".) by a charging member, may cause a resin in the surface of the photosensitive member to be activated by discharging from the charging member to the photosensitive member. If the resin in the surface of the photosensitive member is activated, an attaching material such as a toner or a paper powder can be easily strongly attached to a site activated and such a toner on the surface of the photosensitive member, even if tried to be removed by a cleaning blade, cannot be sometimes sufficiently removed. Such a toner causes any spot and stripe to occur in an electrophotographic image.

A photosensitive member enhanced in wear resistance of the surface by providing a protective layer using a resin or the like of a radical polymer more easily causes image failures such as any spot and stripe to occur because an activated site is difficult to remove with the surface of the photosensitive member being cut. Additionally, discharging is unstable at a low-temperature and a low-humidity, causing locally strong discharging to occur and causing activation of the resin in the surface of the photosensitive member to partially strongly occur.

The present inventors have intensive studies with an objective of obtaining an electrophotographic image which is suppressed in activation of a resin in the surface of an photosensitive member due to discharging from a charging member and which is more suppressed in occurrence of any spot and stripe even in image forming under a low-temperature and low-humidity environment. As a result, the present inventors have found that a combination of the following charging member and photosensitive member contributes to achievement of the above object.

That is, the charging member includes
a support having an electroconductive outer surface, and
an electroconductive layer provided on the outer surface of the support, wherein
the electroconductive layer includes a matrix including a first rubber, and a plurality of domains dispersed in the matrix,
the domains include a second rubber and an electron electroconductive agent,
at least some of the domains are exposed on an outer surface of the charging member,
the outer surface of the charging member is constituted by at least the matrix and at least some of the domains, and
when the volume resistivity of the matrix is defined as Rcm and the volume resistivity of the domains is defined as Rcd, the Rcm is $1.0 \times 10^5$ times or more the Rcd.

The photosensitive member includes a support, a photosensitive layer and a protective layer in the order listed, and
the protective layer includes a metal oxide particle. When the number average primary particle size of the metal oxide particle is defined as Sm and the average value of the equivalent circle diameters of the domains, as observed from the outer surface of the charging member, is defined as Sd, the Sd/Sm satisfies the following expression (1):

$$0.5 < Sd/Sm < 100 \qquad \text{expression (1)}.$$

According to the above combination, the number average primary particle size (Sm) of the metal oxide particle in the protective layer of the electrophotographic photosensitive member and the equivalent circle diameter (Sd) of the domains, as observed from the outer surface of the charging member, satisfy a relationship represented by the above expression (1), thereby allowing discharging from the domains of the charging member to be preferentially performed relative to the metal oxide particle in the protective layer of the photosensitive member. Thus, the resin in the surface of the photosensitive member is considered to be thus suppressed from being activated.

<Charging Member>

A charging member (hereinafter, also referred to as "charging roller") having a roller shape is described as an example of the charging member, with reference to FIG. 1. FIG. 1 is a cross-sectional view perpendicular to a direction (hereinafter, also referred to as "longitudinal direction") along with the axis of the charging roller. A charging roller 3 includes a columnar electroconductive support 3B and an electroconductive layer 3A formed on the outer circumference of the support 3B, namely, the outer surface of the support.

<Support>

The material constituting the support can be appropriately selected from the group consisting of any material known in the field of an electroconductive member for electrophotography and any material usable as an electroconductive member. One example includes aluminum, stainless steel, a synthetic resin having electroconductivity and a metal or an alloy, such as iron and a copper alloy.

Such a material may also be further subjected to an oxidation treatment or a plating treatment with chromium, nickel or the like. The type of such plating can be any of electroplating and electroless plating. Electroless plating is preferable from the viewpoint of dimension stability. Examples of the type of electroless plating here used can include nickel plating, copper plating, gold plating and other plating with any of various alloys.

The plating thickness is preferably 0.05 µm or more in consideration of the balance between working efficiency and anti-corrosion ability, and the plating thickness is preferably 0.10 µm to 30.00 µm. The columnar shape of the support may be a solid columnar shape or a hollow columnar shape (cylindrical shape). The outer diameter of the support is preferably in the range from 3 mm to 10 mm.

When a middle resistance layer or an insulating layer is present between the support and the electroconductive layer, supply of charge cannot sometimes rapidly be made after consumption of charge by discharging. Accordingly, the electroconductive layer is preferably provided directly on the support or provided on the outer circumference of the support with only an intermediate layer including a thin electroconductive resin layer, such as a primer, being interposed therebetween.

A known primer can be selected and used as the primer, depending on, for example, the rubber material for forming the electroconductive layer and the quality of material of the support. Examples of the material of the primer include a thermosetting resin and a thermoplastic resin, and specifically, a known material such as a phenol-based resin, a urethane-based resin, an acrylic resin, a polyester-based resin, a polyether-based resin or an epoxy-based resin can be used.

<Electroconductive Layer>

The electroconductive layer has a matrix and a plurality of domains dispersed in the matrix. The matrix contains a first rubber, and the domains contain a second rubber and an electron electroconductive agent. The matrix and the domains satisfy the following component (i).

Component (i): the volume resistivity Rcm of the matrix is $1.0 \times 10^5$ times or more the volume resistivity Rcd of the domains The Rcm is preferably $1.0 \times 10^5$ times to $1.0 \times 10^{20}$ times, more preferably $1.0 \times 10^7$ times to $1.0 \times 10^{16}$ times, further preferably $1.0 \times 10^{11}$ times to $1.0 \times 10^{16}$ times the Rcd.

An electroconductive member including an electroconductive layer satisfying the component (i) can allow charge to be accumulated in each of the domains, when a bias is applied between the electroconductive member and the photosensitive member. The domains are mutually divided by a relatively electrically insulating matrix and thus simultaneous accepting and donating of charge between the domains can be suppressed. Thus, charge accumulated in the electroconductive layer by one discharging can be mostly prevented from being released.

The Rcd is here preferably $1.00 \times 10^1$ Ω·cm or more and $1.00 \times 10^4$ Ω·cm or less, more preferably $1.00 \times 10^1$ Ω·cm or more and $1.00 \times 10^2$ Ω·cm or less. The range is satisfied, thereby enabling a charge transport path in the electroconductive layer to be controlled and allowing fine discharging to be more easily achieved. Thus, excess discharging can be more certainly suppressed.

Measurement of the volume resistivity Rcd of the domains may be performed by the same method as the method for measuring the volume resistivity of the matrix except that a measurement location is changed to any location corresponding each of the domains and the voltage applied in measurement of the current value is changed to 1 V. A specific procedure will be described below.

The electroconductive layer here preferably satisfies not only the above component (i), but also the following component (ii).

Component (ii): the volume resistivity Rcm of the matrix is more than $1.0 \times 10^{12}$ Ω·cm.

The Rcm is preferably $1.0 \times 10^{14}$ Ω·cm or more, more preferably $1.0 \times 10^{16}$ Ω·cm or more. The upper limit of the Rcm is not particularly limited and is $1.0 \times 10^{17}$ Ω·cm or less as a guide.

It is considered that, when a charging bias is applied between the support of the electroconductive member and the electrophotographic photosensitive member, charge in the electroconductive layer is transferred oppositely from the support of the electroconductive layer as described below, namely, transferred toward the outer surface of the electroconductive member. That is, charge is accumulated in the vicinity of the interface between the matrix and the domains.

The charge is then sequentially delivered from any of the domains, located closer to the electroconductive support, toward any of the domains, located opposite to the electroconductive support, and reaches a surface (hereinafter, also referred to as "outer surface of the electroconductive layer") of the electroconductive layer, located opposite to the electroconductive support. If charge of all the domains is here transferred toward the outer surface of the electroconductive layer in one charging step, any time for accumulating charge in the electroconductive layer is taken for the next charging step. Thus, a high-speed electrophotographic image forming process has a difficulty in achieving stable discharging.

Accordingly, preferably, accepting and donating of charge between the domains do not simultaneously occur even in application of a charging bias. Since transfer of charge is restricted in a high-speed electrophotographic image forming process, a sufficient amount of charge is preferably accumulated in each of the domains in order to discharge a sufficient amount of charge by one discharging.

The electroconductive layer can satisfy the above components (i) and (ii), thereby inhibiting charge accumulated in the electroconductive layer from diverting the domains and transferring in the matrix in application of a charging bias between the charging member and the photosensitive member. Thus, charge accumulated by one discharging can be inhibited from being mostly consumed. Additionally, a state can also be prevented where a conductive path almost communicating in the electroconductive layer is formed by leakage of charge accumulated in the domains into the matrix.

It is considered by the present inventors that a configuration where regions (domains) where charge is sufficiently accumulated are divided in an electrically insulating region (matrix) is effective for transferring charge via the domains in the electroconductive layer and achieving fine discharging. The volume resistivity of the matrix can be in a range of a high resistance region as described above, thereby allowing sufficient charge to be held at the interface with each of the domains and allowing charge leakage from the domains to be suppressed.

It is extremely effective that a charge transfer path is limited to a path via the domains in order to achieve fine discharging and a necessary and sufficient amount of discharging. Leakage of charge from the domains into the matrix can be suppressed and a charge transport path can be limited to a path via any plurality of domains, thereby resulting in an enhancement in density of charge present in the domains and thus a more increase in amount of filling of charge in each of the domains.

Thus, it is considered that the total amount of charge which can involve in discharging, in the surface of the domains as a conductive phase serving as the point of origin of discharging, can be enhanced and, as a result, easiness of discharging from the surface of the electroconductive member can be enhanced.

The volume resistivity of the matrix can be measured with a fine probe by thinning the electroconductive layer. Any unit which can make a very thin sample, such as a microtome, is used as the unit for such thinning A specific procedure will be described below.

The volume resistivity Rcd of the domains can be adjusted by, for example, varying the type and the amount of the electron electroconductive agent to thereby allow a rubber ingredient in the domains to have a predetermined value of electroconductivity.

A rubber composition including a rubber ingredient for the matrix can be used as the rubber material for the domains. The difference in solubility parameter (SP value) from the rubber material for forming the matrix is preferably in a certain range in order to form a matrix domain structure. That is, the absolute value of the difference between the SP value of the first rubber and the SP value of the second rubber is preferably 0.4 $(J/cm^3)^{0.5}$ or more and 5.0 $(J/cm^3)^{0.5}$ or less, more preferably 0.4 $(J/cm^3)^{0.5}$ or more and 2.2 $(J/cm^3)^{0.5}$ or less.

Examples of the electron electroconductive agent for adjusting the volume resistivity of the domains include carbon black, graphite, an oxide such as titanium oxide or tin oxide; a metal such as Cu or Ag; and a particle whose surface is coated with oxide or metal and made electroconductive. Two or more of such electroconductive agents may be, if necessary, appropriately compounded and used.

Among the above electron electroconductive agents, electroconductive carbon black is preferably used which is high in affinity with rubber and which is easily controlled in terms of the distance between the electron electroconductive agents. The type of carbon black compounded in the domains is not particularly limited. Specific examples include gas furnace black, oil furnace black, thermal black, lamp black, acetylene black and ketjen black.

In particular, electroconductive carbon black can be suitably used which can impart high electroconductivity to the domains and in which the amount of DBP oil absorption is 40 $cm^3/100$ g or more and 170 $cm^3/100$ g or less.

The content of the electron electroconductive agent such as electroconductive carbon black is preferably 20 parts by mass or more and 150 parts by mass or less based on 100 parts by mass of the second rubber included in the domains. The content is more preferably 50 parts by mass or more and 100 parts by mass or less.

Such an electroconductive agent is preferably compounded in a larger amount than the amount in a common electroconductive member for electrophotography. Thus, the volume resistivity of the domains can be easily controlled to the range of $1.00 \times 10^1$ Ω·cm or more and $1.00 \times 10^4$ Ω·cm or less.

A filler, a processing aid, a crosslinking aid, a crosslinking promoter, an anti-aging agent, a crosslinking promotion aid, a crosslinking delaying agent, a softening agent, a dispersant, a colorant and/or the like commonly used as a compounding agent for rubber may be, if necessary, added to a rubber composition for the domains as long as the effects of the present disclosure are not impaired.

<Component (iii); Distance Between Adjacent Wall Surfaces of Domains>

The arithmetic average value Dm (hereinafter, also simply referred to as "distance Dm between the domains") with respect to the distance between adjacent wall surfaces of the domains in observation of the cross section in the thickness direction of the electroconductive layer is preferably 6.00 µm or less, more preferably 2.00 µm or less, further preferably 1.00 µm or less for accepting and donating of charge between the domains.

The distance Dm between the domains is preferably 0.15 µm or more, more preferably 0.20 µm or more because the domains can be certainly electrically divided in an insulation region (matrix) to thereby allow charge to be more easily accumulated in the domains.

Method for Measuring Distance Dm Between Domains

The method for measuring the distance Dm between the domains may be performed as follows.

First, a section is produced by the same method as the above method for measuring the volume resistivity of the matrix. The section may be subjected to a pre-treatment which suitably obtains a contrast between an electroconductive phase and an insulation phase, such as a dyeing treatment or a vapor deposition treatment, in order to suitably perform observation of the matrix domain structure.

Such a section, subjected to formation of a fracture cross-section and platinum vapor deposition, is observed with a scanning electron microscope (SEM) to thereby confirm the presence of the matrix domain structure. In particular, the section is preferably observed with SEM 5000 times in terms of accuracy of quantitative determination of the areas of the domains A specific procedure will be described below.

The electroconductive member can be formed through, for example, a method including the following steps (i) to (iv).

Step (i): a step of preparing a rubber mixture (hereinafter, also referred to as "CMB") for domain formation, the mixture including carbon black and a second rubber;

Step (ii): a step of preparing a rubber mixture (hereinafter, also referred to as "MRC") for forming a matrix including a first rubber;

Step (iii): a step of kneading CMB and MRC to prepare a rubber mixture having a matrix-domain structure.

Step (iv): a step of forming a layer of the rubber mixture prepared in step (iii) directly on the electroconductive support or with other layer being interposed therebetween, and curing such a layer of the rubber composition to thereby form the electroconductive layer.

Components (i) to (iii) can be controlled by, for example, selection of the material for use in each of the above steps and adjustment of production conditions. The description will be made below.

First, the volume resistivity of the matrix with respect to component (i) is defined depending on the makeup of MRC.

The first rubber for use in MRC is preferably rubber low in electroconductivity. The rubber is preferably at least one selected from the group consisting of natural rubber, butadiene rubber, butyl rubber, acrylonitrile/butadiene rubber, urethane rubber, silicone rubber, fluororubber, isoprene rubber, chloroprene rubber, styrene/butadiene rubber, ethylene/propylene rubber, ethylene/propylene/diene rubber and polynorbornene rubber.

The first rubber is more preferably at least one selected from the group consisting of butyl rubber, styrene/butadiene rubber and ethylene/propylene/diene rubber.

As long as the volume resistivity of the matrix is in the above range, a filler, a processing aid, a crosslinking agent, a crosslinking aid, a crosslinking promoter, a crosslinking promotion aid, a crosslinking delaying agent, an anti-aging agent, a softening agent, a dispersant, a colorant and/or the like may be, if necessary, added to MRC. On the other hand, MRC preferably does not contain any electron electroconductive agent such as carbon black in order to allow the volume resistivity of the matrix to be in the above range.

The volume resistivity Rcd of the domains can be adjusted by the amount of the electron electroconductive agent in CMB. For example, a case of use of electroconductive carbon black where the amount of DBP oil absorption is 40 $cm^3/100$ g or more and 170 $cm^3/100$ g or less, as the electron electroconductive agent, is adopted. A desired range can be achieved by preparing CMB such that 40 parts by mass or more and 200 parts by mass or less of the electroconductive carbon black is included based on 100 parts by mass of the second rubber in CMB.

Furthermore, control of the following four items (a) to (d) is effective in terms of the dispersing state of the domains involving the component (iii).

(a) the difference in interfacial tension a between CMB and MRC.

(b) the ratio ($\eta m/\eta d$) of the viscosity ($\eta m$) of MRC to the viscosity ($\eta d$) of CMB.

(c) the shear speed ($\gamma$) in kneading of CMB and MRC and the amount (EDK) of energy in shearing, in step (iii).

(d) the volume fraction of CMB to MRC in step (iii).

(a) Difference in Interfacial Tension Between CMB and MRC

In general, when two immiscible rubbers are mixed, phase separation occurs. The reason for such phase separation is because interaction between the same types of polymers is stronger than interaction between different polymers and thus the same polymers aggregate and are reduced in free energy for stabilization.

The interface in a phase separation structure is contacted with such a different polymer, and is higher in free energy than the interior stabilized by interaction between the same types of polymers. As a result, interfacial tension is generated which tries to result in a decrease in contact area with such a different polymer for a reduction in free energy at the interface. When the interfacial tension is small, even such a different polymer is tried to be more uniformly mixed in order to increase entropy. The state of being uniformly mixed means dissolution and the SP value (solubility parameter) serving as a guide of solubility tends to correlate to the interfacial tension.

In other words, the difference in interfacial tension between CMB and MRC is considered to correlate to the difference in SP value with respect to each rubber included. Such each rubber is preferably selected so that the difference between the respective absolute values of the solubility parameter SP value of the first rubber in MRC and the SP value of the second rubber in CMB is preferably 0.4 $(J/cm^3)^{0.5}$ or more and 5.0 $(J/cm^3)^{0.5}$ or less, more preferably 0.4 $(J/cm^3)^{0.5}$ or more and 2.2 $(J/cm^3)^{0.5}$ or less. When the difference is in the range, a stable phase separation structure can be formed and the domain diameter in CMB can be decreased.

A specific example of the second rubber which can be used in CMB is preferably at least one selected from the group consisting of natural rubber (NR), isoprene rubber (IR), butadiene rubber (BR), acrylonitrile/butadiene rubber (NBR), styrene/butadiene rubber (SBR), butyl rubber (IIR), ethylene/propylene rubber (EPM), ethylene/propylene/diene rubber (EPDM), chloroprene rubber (CR), nitrile rubber (NBR), hydrogenated nitrile rubber (H-NBR), silicone rubber and urethane rubber (U).

The second rubber is more preferably at least one selected from the group consisting of butadiene rubber (BR), styrene/butadiene rubber (SBR), butyl rubber (IIR) and acrylonitrile/butadiene rubber (NBR), further preferably at least one selected from the group consisting of butadiene rubber (BR), styrene/butadiene rubber (SBR) and butyl rubber (IIR). The second rubber is still more preferably at least one selected from the group consisting of butadiene rubber (BR) and butyl rubber (IIR).

The thickness of the electroconductive layer is not particularly limited as long as the objective function(s) and effect(s) of the electroconductive member are obtained. The thickness of the electroconductive layer is preferably 1.0 mm or more and 4.5 mm or less.

The mass ratio between the domains and the matrix (domains:matrix) is preferably 5:95 to 40:60, more preferably 10:90 to 30:70, further preferably 13:87 to 25:75.

<Method for Measuring SP Value>

The SP value can be calculated at a high accuracy by creating a calibration curve by use of a material having a known SP value. The known SP value here used can also be any value in the catalog from the manufacturer of the material. For example, the SP values of NBR and SBR do not depend on the molecular weights and are substantially determined by the content ratio between acrylonitrile and styrene.

Accordingly, the rubber constituting the matrix and the rubber constituting the domains are analyzed with respect to the content ratio between acrylonitrile or styrene by use of an analysis procedure such as pyrolysis gas chromatography (Py-GC) and solid state NMR. Thus, the SP values can be calculated from the calibration curve obtained from the material having a known SP value.

The SP value of isoprene rubber is determined depending on the structure of any isomer such as 1,2-polyisoprene, 1,3-polyisoprene, 3,4-polyisoprene, cis-1,4-polyisoprene and trans-1,4-polyisoprene. Accordingly, the SP value can be calculated with the material having a known SP value by analyzing the content ratio of any isomers by Py-GC, solid state NMR and/or the like as in SBR and NBR.

With respect to the material having a known SP value, the SP value is determined according to the Hansen sphere method.

b) Viscosity Ratio Between CMB and MRC

As the viscosity ratio (CMB/MRC) ($\eta d/\eta m$) between CMB and MRC is closer to 1, the maximum Feret diameter of the domains can be smaller. Specifically, the viscosity ratio is preferably 1.0 or more and 2.0 or less. The viscosity ratio between CMB and MRC can be adjusted by selection of the Mooney viscosity of each raw material rubber for use in CMB and MRC, and the type and the amount of a filler compounded.

A plasticizer such as a paraffin oil can also be added to such an extent that formation of the phase separation structure is not interrupted. The viscosity ratio can be adjusted by adjusting the temperature in kneading.

The viscosities of a rubber mixture for domain formation and a rubber mixture for matrix formation can be each obtained by measuring the Mooney viscosity $ML_{(1+4)}$ based on JIS K6300-1:2013 at each rubber temperature in kneading.

c) Shear Speed in Kneading of MRC and CMB, and Amount of Energy in Shearing

As the shear speed in kneading of MRC and CMB is higher and the amount of energy in shearing is larger, the distance Dm between the domains can be smaller.

The shear speed can be increased by increasing the inner diameter of a stirring member such as a blade and a screw of a kneading machine to thereby decrease the gap from an end surface of the stirring member to an inner wall of the kneading machine or increase the rotation speed of the stirring member. An increase in energy in shearing can be achieved by an increase in rotation speed of the stirring member or increases in respective viscosities of the first rubber in CMB and the second rubber in MRC.

d) Volume Fraction of CMB to MRC

The volume fraction of CMB to MRC correlates to the probability of collision and coalescence of the rubber mixture for domain formation to the rubber mixture for matrix formation. Specifically, a reduction in volume fraction of the rubber mixture for domain formation to the rubber mixture for matrix formation reduces the probability of collision and coalescence of the rubber mixture for domain formation to the rubber mixture for matrix formation. In other words, the volume fraction of the domains in the matrix can be reduced as long as necessary electroconductivity is obtained, thereby resulting in a reduction in distance Dm between the domains.

The volume fraction of CMB to MRC (namely, volume fraction to the matrix of the domains) is preferably 15% or more and 40% or less.

<Component (iv): Domain Diameters D and Sd>

The domain diameter D defined as the arithmetic average value of the equivalent circle diameters of the domains, as observed from the cross section of the electroconductive layer, is preferably 0.10 µm or more, in particular, 0.15 µm or more, furthermore, 0.20 µm or more. The upper limit of the domain diameter D is preferably 5.00 µm or less. When the domain diameter D is in the range, accepting and donating of charge between the domains are more smoothly performed in a direction from the support towards the outer surface of the charging member.

The domain diameter Sd defined as the arithmetic average value of the equivalent circle diameters of the domains, at least some of which are exposed on the outer surface, as observed from the outer surface of the charging member, is preferably 0.10 µm or more, in particular, 0.15 µm or more, furthermore, 0.20 µm or more. The upper limit of the domain diameter D is preferably 5.00 µm or less. When the domain diameter Sd is in the range, discharging to the photosensitive member can be more stably performed. The respective methods for measuring the domain diameter D and the domain diameter Sd will be described below.

Control of the domain diameters D and Sd is here described.

In general, the following Taylor's expression, Wu's empirical equation and Tokita's calculation expression are known with respect to elements for determining the domain diameter L in the matrix-domain structure formed by melting and kneading two immiscible polymers.

$$L = [C \cdot \sigma/\eta m \cdot \gamma] \cdot f(\eta m/\eta d) \qquad \text{Taylor's calculation expression}$$

$$\gamma \cdot L \cdot \eta m/\sigma = 4(\eta d/\eta m) 0.84 \cdot \eta d/\eta m > 1$$

$$\gamma \cdot L \cdot \eta m/\sigma = 4(\eta d/\eta m) - 0.84 \cdot \eta d/\eta m < 1 \qquad \text{Wu's empirical equation}$$

$$L = f(1/\eta)*(1/\gamma)*(\eta d/\eta m)*P*\varphi*\sigma*$$
$$(1/EDK)*(1/\tau)*\chi 12) \qquad \text{Tokita's calculation expression}$$

In the above respective calculation expressions and empirical equation, L represents the domain diameter of CMB, C represents a constant number, a represents the interfacial tension, $\eta m$ represents the viscosity of the matrix, $\eta d$ represents the viscosity of the domains, $\gamma$ represents the shear speed, $\eta$ represents the viscosity of a mixing system, P represents the probability of collision and coalescence, $\varphi$ represents the volume of a domain phase and EDK represents the scission energy of a domain phase.

The domain diameters D and Sd can be adjusted according to the above calculation expressions and empirical equation. The domain diameters can be controlled by rotation number of kneading as an index of the kneading time and the kneading strength in the course of cleavage of the raw material rubber of CMB and thus a gradual decrease in size of the rubber in the kneading step of CMB and MRC, and, as the kneading time is longer and the kneading rotation speed is higher, the domain diameters D and Sd can be smaller and uniformity of the distance Dm between wall surfaces of the domains can be enhanced.

[Electrophotographic Photosensitive Member]

The electrophotographic photosensitive member is characterized by including a support, a photosensitive layer and a protective layer in the order listed.

Examples of the method for producing the electrophotographic photosensitive member include a method involving preparing a coating liquid for each layer described below, sequentially coating each of desired layers and drying the resultant. Examples of the method for coating with such each coating liquid include dip coating, spray coating, ink-jet coating, roll coating, die coating, blade coating, curtain coating, wire bar coating and ring coating. In particular, dip coating is preferable from the viewpoints of efficiency and productivity.

Hereinafter, each layer will be described also with reference to FIG. 3.

<Support>

Figure 3:
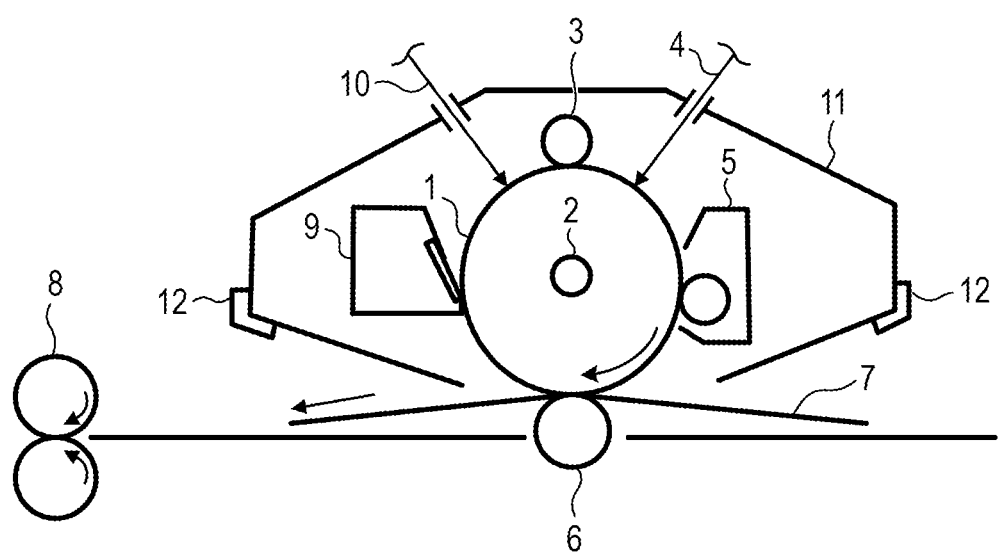
FIG. 3 illustrates one example of a schematic configuration of the electrophotographic apparatus of the present disclosure.

The electrophotographic photosensitive member (sign 1 in FIG. 3) includes a support (sign 2 in FIG. 3). The support is preferably an electroconductive support having electroconductivity. Examples of the shape of the support include cylindrical, belt and sheet shapes. In particular, the support is preferably a cylindrical support. The surface of the support may be subjected to, for example, an electrochemical treatment such as anodization, a blast treatment or a cutting treatment.

The material of the support is preferably a metal, a resin, glass or the like.

Examples of the metal include aluminum, iron, nickel, copper, gold, stainless steel and an alloy thereof. In particular, an aluminum support using aluminum is preferable. Electroconductivity may be imparted to a resin or glass by a treatment such as mixing or covering with an electroconductive material.

<Electroconductive Layer of Photosensitive Member>

The electroconductive layer of the photosensitive member may be provided on the support. The electroconductive layer of the photosensitive member can be provided to thereby shield scratches and irregularities on the support surface and control reflection of light on the support surface.

The electroconductive layer of the photosensitive member preferably contains an electroconductive particle and a resin.

Examples of the material of the electroconductive particle include a metal oxide, a metal and carbon black.

Examples of the metal oxide include zinc oxide, aluminum oxide, indium oxide, silicon oxide, zirconium oxide, tin oxide, titanium oxide, magnesium oxide, antimony oxide and bismuth oxide. Examples of the metal include aluminum, nickel, iron, nichrome, copper, zinc and silver.

In particular, the metal oxide is preferably used and, particularly, titanium oxide, tin oxide or zinc oxide is more preferably used for the electroconductive particle.

When the metal oxide is used for the electroconductive particle, the surface of the metal oxide may be treated with a silane coupling agent or the like, or the metal oxide may be doped with an element such as phosphorus or aluminum, or an oxide thereof.

The electroconductive particle may have a layered configuration of a core particle and a covering layer with which the particle is covered. Examples of the core particle include respective particles of titanium oxide, barium sulfate and zinc oxide. Examples of the covering layer include a layer of a metal oxide such as tin oxide.

When such a metal oxide is used for the electroconductive particle, the volume average particle size is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin and an alkyd resin.

An electroconductive layer may further contain a silicone oil, a resin particle and a shielding agent of titanium oxide.

The average thickness of the electroconductive layer of the photosensitive member is preferably 1 µm or more and 50 µm or less, particularly preferably 3 µm or more and 40 µm or less.

The electroconductive layer of the photosensitive member can be formed by preparing a coating liquid for the electroconductive layer of the photosensitive member, the coating liquid including the above respective materials and a solvent, forming a coating film thereof and drying the film. Examples of the solvent for use in the coating liquid include an alcohol-based solvent, a sulfoxide-based solvent, a ketone-based solvent, an ether-based solvent, an ester-based solvent and an aromatic hydrocarbon-based solvent. Examples of the dispersing method for dispersing the electroconductive particle in the coating liquid for the electroconductive layer of the photosensitive member include a method using a paint shaker, a sand mill, a ball mill or a liquid collision-type high-speed disperser.

<Undercoat Layer>

An undercoat layer may be provided on the support or the electroconductive layer of the photosensitive member. The undercoat layer can be provided to thereby enhance an adhesion function between layers and impart a charge injection blocking function.

The undercoat layer preferably contains a resin. The undercoat layer may also be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinylphenol resin, an alkyd resin, a polyvinyl alcohol resin, a polyethylene oxide resin, a polypropylene oxide resin, a polyamide resin, a polyamide acid resin, a polyimide resin, a polyamideimide resin and a cellulose resin.

With respect to the monomer having a polymerizable functional group, examples of the polymerizable functional group include an isocyanate group, a block isocyanate group, a methylol group, an alkylated methylol group, an epoxy group, a metal alkoxide group, a hydroxyl group, an amino group, a carboxyl group, a thiol group, a carboxylic anhydride group and a carbon-carbon double bond group.

The undercoat layer may further contain an electron transport substance, a metal oxide, a metal and an electro-conductive polymer for the purpose of enhancing electric characteristics. In particular, an electron transport substance and a metal oxide are preferably used.

Examples of the electron transport substance include a quinone compound, an imide compound, a benzimidazole compound, a cyclopentadienylidene compound, a fluorenone compound, a xanthone compound, a benzophenone compound, a cyanovinyl compound, an aryl halide compound, a silole compound and a boron-containing compound. An electron transport substance having a polymerizable functional group may also be used as the electron transport substance and copolymerized with the monomer having the above polymerizable functional group, thereby forming the undercoat layer as a cured film.

Examples of the metal oxide include indium tin oxide, tin oxide, indium oxide, titanium oxide, zinc oxide, aluminum oxide and silicon dioxide. Examples of the metal include gold, silver and aluminum. The undercoat layer may further contain an additive.

The average thickness of the undercoat layer is preferably 0.1 μm or more and 50.0 μm or less, more preferably 0.2 μm or more and 40.0 μm or less, particularly preferably 0.3 μm or more and 30.0 μm or less.

The undercoat layer can be formed by preparing a coating liquid for the undercoat layer, the coating liquid containing the above respective materials and a solvent, forming a coating film thereof and drying and/or curing the film. Examples of the solvent for use in the coating liquid include an alcohol-based solvent, a ketone-based solvent, an ether-based solvent, an ester-based solvent and an aromatic hydrocarbon-based solvent.

<Photosensitive Layer>

The photosensitive layer of the electrophotographic photosensitive member is classified mainly to (1) a layered photosensitive layer and (2) a single-layered photosensitive layer. The (1) layered photosensitive layer has a charge generation layer containing a charge generation substance and a charge transport layer containing a charge transport substance. The (2) single-layered photosensitive layer has a photosensitive layer containing both a charge generation substance and a charge transport substance.

(1) Layered Photosensitive Layer

The layered photosensitive layer includes a charge generation layer and a charge transport layer.

(1-1) Charge Generation Layer

The charge generation layer preferably contains a charge generation substance and a resin.

Examples of the charge generation substance include an azo pigment, a perylene pigment, a polycyclic quinone pigment, an indigo pigment and a phthalocyanine pigment. In particular, an azo pigment and a phthalocyanine pigment are preferable. An oxotitanium phthalocyanine pigment, a chloro gallium phthalocyanine pigment and a hydroxy gallium phthalocyanine pigment are preferable for the phthalocyanine pigment.

The content of the charge generation substance in the charge generation layer is preferably 40% by mass or more and 85% by mass or less, more preferably 60% by mass or more and 80% by mass or less based on the total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin and a polyvinyl chloride resin. In particular, a polyvinyl butyral resin is more preferable.

The charge generation layer may further contain any additive such as an antioxidant and an ultraviolet absorber. Specific examples include a hindered phenol compound, a hindered amine compound, a sulfur compound, a phosphorus compound and a benzophenone compound.

The average thickness of the charge generation layer is preferably 0.10 μm or more and 1.00 μm or less, more preferably 0.15 μm or more and 0.40 μm or less.

The charge generation layer can be formed by preparing a coating liquid for the charge generation layer, the coating liquid containing the above respective materials and a solvent, forming a coating film thereof and drying the film. Examples of the solvent for use in the coating liquid include an alcohol-based solvent, a sulfoxide-based solvent, a ketone-based solvent, an ether-based solvent, an ester-based solvent and an aromatic hydrocarbon-based solvent.

(1-2) Charge Transport Layer

The charge transport layer preferably contains a charge transport substance and a resin.

Examples of the charge transport substance include a polycyclic aromatic compound, a heterocyclic compound, a hydrozone compound, a styryl compound, an enamine compound, a benzidine compound, a triarylamine compound and a resin having a group derived from such a substance. In particular, a triarylamine compound and benzidine compound are preferable because of being high in effect of suppressing the occurrence of a black spot.

The content of the charge transport substance in the charge transport layer is preferably 25% by mass or more and 70% by mass or less, more preferably 30% by mass or more and 55% by mass or less based on the total mass of the charge transport layer.

Examples of the resin include a polyester resin, a polycarbonate resin, an acrylic resin and a polystyrene resin. In particular, a polycarbonate resin and a polyester resin are preferable. A polyarylate resin is particularly preferable for the polyester resin.

The content ratio (mass ratio) between the charge transport substance and the resin is preferably 4:10 to 20:10, more preferably 5:10 to 12:10.

The charge transport layer may contain any additive such as an antioxidant, an ultraviolet absorber, a plasticizer, a leveling agent, a slipperiness-imparting agent and a wear resistance improver. Specific examples include a hindered phenol compound, a hindered amine compound, a sulfur compound, a phosphorus compound, a benzophenone compound, a siloxane-modified resin, a silicone oil, fluororesin particle, a polystyrene resin particle, a polyethylene resin particle, a silica particle, an alumina particle and a boron nitride particle.

The average thickness of the charge transport layer is preferably 5 μm or more and 50 μm or less, more preferably 8 μm or more and 40 μm or less, particularly preferably 10 μm or more and 30 μm or less.

The charge transport layer can be formed by preparing a coating liquid for the charge transport layer, the coating liquid containing the above respective materials and a solvent, forming a coating film thereof and drying the film. Examples of the solvent for use in the coating liquid include an alcohol-based solvent, a ketone-based solvent, an ether-based solvent, an ester-based solvent and an aromatic hydrocarbon-based solvent. Among the solvents, an ether-based solvent or an aromatic hydrocarbon-based solvent is preferable.

(2) Single-Layered Photosensitive Layer

The single-layered photosensitive layer can be formed by preparing a coating liquid for the photosensitive layer, the coating liquid containing a charge generation substance, a charge transport substance, a resin and a solvent, forming a coating film thereof and drying the film. Examples of the charge generation substance, the charge transport substance and the resin are the same as examples of the materials in the above "(1) Layered photosensitive layer".

<Protective Layer>

The protective layer contains a metal oxide particle. Examples of the metal oxide particle include titanium oxide, zinc oxide, tin oxide and indium oxide.

The average primary particle size of the metal oxide particle is measured by the following method.

[Average Primary Particle Size Sm and Volume Ratio of Metal Oxide Particle]

The average primary particle size Sm of the metal oxide particle is preferably 0.01 μm or more and 0.50 μm or less. Given that the Sd/Sm is more than 0.5 and less than 100, namely, 0.5<Sd/Sm<100, the Sm can be in the above range, thereby allowing discharging from the domains of the charging member in the present disclosure to be more certainly preferentially received.

The volume ratio of the metal oxide particle in the protective layer is preferably 0.10 or more and 0.70 or less. Activation of the resin due to discharging from the domains of the charging member in the present disclosure can be more certainly prevented.

The average primary particle size Sm of the metal oxide particle and the volume ratio of the metal oxide particle in the protective layer can be determined by, for example, observing a thin section subjected to formation and pretreatment of a fracture cross-section of the photosensitive member, with a laser microscope, a scanning electron microscope (SEM) and/or a transmission electron microscope (TEM).

In order to quantitatively determine the resulting image taken, a fracture cross-section image obtained by observation with SEM is converted into 8-bit grayscale by use of image treatment software like ImageProPlus, and thus a monochrome image with 256 levels is obtained. Next, white and black in the image are subjected to inversion processing so that an image corresponding to the metal oxide particle in the fracture cross-section is whitened, and binarization is performed. Next, the function of the image treatment software is used to calculate the volume ratio of the metal oxide particle in the image.

The size and the volume ratio of the above metal oxide particle may be determined with calculation by performing the above measurement with respect to each one thin section sample cut out in any locations of respective regions obtained by dividing into quarters in a circumferential direction and dividing into fifths in a longitudinal direction, and determining the arithmetic average of the measurement values at 20 points in total.

Any metal oxide particle having an acryloyloxy group or a methacryloyloxy group is preferably used. Such a metal oxide particle can be enhanced in affinity with a chain polymerizable functional group described below, thereby preventing dropping from the protective layer even in long-term use.

Such a metal oxide particle having a (meth)acryloyloxy group is obtained by the following method. A tin oxide particle having a reactive acryloyl group or methacryloyl group can be obtained by subjecting a tin oxide particle to a surface treatment with a silane compound represented by the above general formula (S) or the like. Such a surface covering treatment is preferably made by using 0.1 to 100 parts by mass of the silane compound as a surface treatment agent and 50 to 5000 parts by mass of a solvent based on 100 parts by mass of the tin oxide particle and using a wet medium dispersion type apparatus.

(S)

(wherein $R^3$ represents a hydrogen atom, an alkyl group having 1 to 10 carbon atoms or an aralkyl group having 1 to 10 carbon atoms, $R^4$ represents an organic group having a reactive acryloyl group or methacryloyl group, X represents a halogen atom, an alkoxy group, an acyloxy group, an aminoxy group or a phenoxy group and n is an integer of 1 to 3.)

Furthermore, the maximum volume resistivity Rmax of the protective layer surface is preferably $10^4$ times or more the minimum volume resistivity Rmin of the protective layer surface. A case of $10^5$ times or more is more preferable. The volume resistivity of the protective layer surface can be in the above range, thereby suppressing excess discharging.

The volume resistivity of the protective layer surface can be adjusted by the primary particle size, the volume ratio, the surface treatment and the like of the metal oxide particle.

The protective layer may contain any additive such as an antioxidant, an ultraviolet absorber, a plasticizer, a leveling agent, a slipperiness-imparting agent, a wear resistance improver and a polymerization reaction initiator. Specific examples include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, an alumina particle and a silica particle.

Furthermore, a charge transport substance can be added. Examples of the charge transport substance include a triarylamine compound, a hydrozone compound, stilbene compound, a pyrazoline compound, an oxazole compound, a thiazole compound and a triarylmethane compound.

In the case of the charge transport substance, the above charge transport substance or a polymerizable monomer/oligomer having a backbone of the above charge transport substance is preferably used. Examples include a compound having a chain polymerizable functional group such as an acryloyloxy group, a methacryloyloxy group or a styryl group and a charge transport substance having a sequential polymerizable functional group such as a hydroxyl group, an alkoxysilyl group or an isocyanate group. A compound having both a charge transportable structure and an acryloyloxy group or a methacryloyloxy group in the same molecule is more preferably used from the viewpoint of charge transport capacity. The charge transportable structure is preferably a triphenylamine structure from the viewpoint of charge transport ability.

Specific examples of a triphenylamine compound having an acryloyloxy group or a methacryloyloxy group are represented in structural formulae (OCL-1) to (OCL-11). In particular, (OCL-1) to (OCL-9) each less in chain polymerizable functional group serving as the point of origin of activation are preferable.
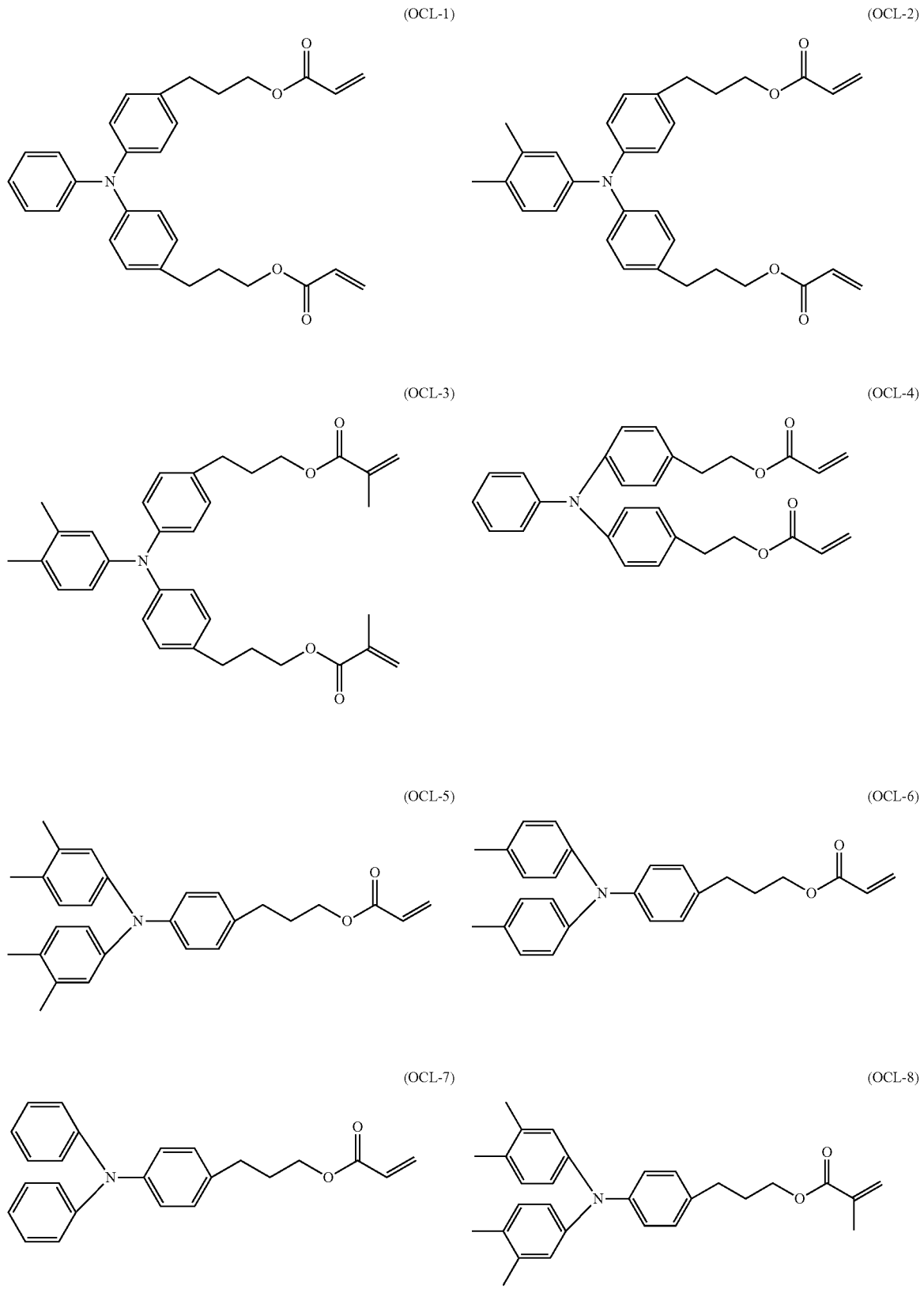

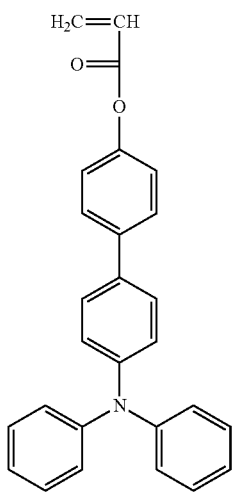

(OCL-9)

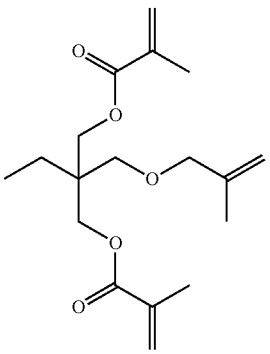

(OCL-10)

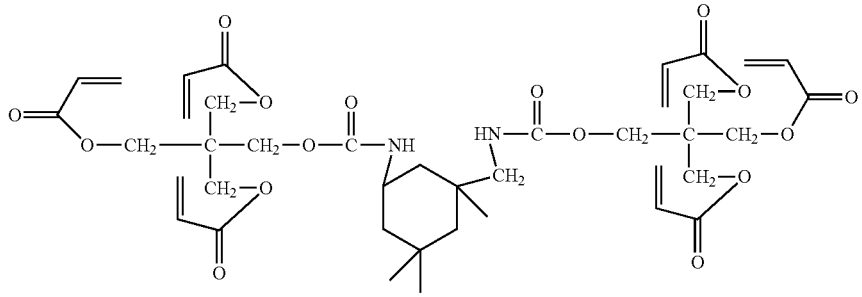

(OCL-11)

The average thickness of the protective layer is preferably 0.5 μm or more and 10.0 μm or less, preferably 1.0 μm or more and 7.0 μm or less.

The protective layer can be formed by preparing a coating liquid for the protective layer, the coating liquid containing the above respective materials and a solvent, forming a coating film thereof on the photosensitive layer and curing the film. Examples of the solvent for use in the coating liquid include an alcohol-based solvent, a ketone-based solvent, an ether-based solvent, a sulfoxide-based solvent, an ester-based solvent and an aromatic hydrocarbon-based solvent.

Examples of the polymerization reaction include a thermal polymerization reaction, a photopolymerization reaction and a radiation polymerization reaction.

Furthermore, the protective layer preferably has a siloxane structure or a fluoro group for the purpose of suppressing attachment of a toner, an external additive, a paper powder and/or the like after activation of the resin. It is considered that the protective layer can have a siloxane structure low in surface free energy or a fluoro group, thereby reducing attachment of a toner, an external additive, a paper powder and/or the like into the protective layer.

The surface of the protective layer may be subjected to surface processing with an abrasive sheet, a shape transfer member, glass beads, zirconia beads or the like, or irregularities may be formed on the surface by use of a constituent material of the coating liquid.

When coating with the coating liquid for each of the above layers is made, a coating method such as a dip coating method (dipping method), a spray coating method, spinner coating method, a bead coating method, a blade coating method or a beam coating method can be used.

[Process Cartridge and Electrophotographic Apparatus]

A process cartridge according to one aspect of the present disclosure is characterized by integrally supporting the above-mentioned electrophotographic photosensitive member and at least one unit selected from the group consisting of a charging unit, a development unit, a transfer unit and a cleaning unit, and being detachably attachable to an electrophotographic apparatus body.

An electrophotographic apparatus according to one aspect of the present disclosure is characterized by including the above-mentioned electrophotographic photosensitive member, a charging unit, an exposure unit, a development unit and a transfer unit.

FIG. 3 illustrates one example of a schematic configuration of an electrophotographic apparatus including a process cartridge 11 including an electrophotographic photosensitive member.

Reference numeral 1 represents a cylindrical electrophotographic photosensitive member and is rotationally driven around a support 2 at a predetermined peripheral speed in a direction of an arrow. The surface of the electrophotographic photosensitive member 1 is charged to a positive or negative potential by a charging member 3. The charging member 3 is more preferably a charging system that applies only a direct current. The surface of the electrophotographic photosensitive member 1 charged is irradiated with exposure light 4 from an exposure unit (not illustrated) and an electrostatic latent image corresponding to objective image information is formed. The electrostatic latent image formed on the surface of the electrophotographic photosensitive member 1 is developed by a toner received in a development unit 5 and a toner image is formed on the surface of the electrophotographic photosensitive member 1. The toner image formed on the surface of the electrophotographic photosensitive member 1 is transferred to a transfer material 7 by a transfer unit 6. The transfer material 7 to which the toner image is transferred is conveyed to a fixing unit 8, subjected to a fixing treatment of the toner image, and printed and taken out of the electrophotographic apparatus. The electrophotographic apparatus may include a cleaning unit 9 that removes an attaching material such as any toner remaining on the surface of the electrophotographic photosensitive member 1 after transfer. No cleaning unit may be separately provided and a so-called cleanerless system may be used which removes the above attaching material by a development unit or the like. The electrophotographic apparatus may include a neutralization mechanism that performs a neutralization treatment of the surface of the electrophotographic photosensitive member 1 with pre-exposure light 10 from a pre-exposure unit (not illustrated). A guide unit 12 such as a rail may be provided in order to detach and attach a process cartridge 11 according to the present aspect to the electrophotographic apparatus body. A case is preferable where the electrophotographic apparatus includes a power source that applies only a direct voltage to the charging member. A case is more preferable where the electrophotographic apparatus includes a lubricant feeding unit that feeds a lubricant to the outer surface of the electrophotographic photosensitive member and the lubricant feeding unit retains the lubricant.

The electrophotographic photosensitive member according to the present disclosure can be used for, for example, a laser beam printer, a LED printer, a copier, a facsimile and a complex machine thereof.

EXAMPLES

Hereinafter, the process cartridge and the like according to the present disclosure will be more specifically described with reference to Examples and Comparative Examples. Herein, the present disclosure is not limited to the following embodied Examples at all without departing from the gist thereof. In the following description of Examples, "part(s)" is expressed on a mass basis unless specifically noted.

<Production of Electroconductive Member 1>

1. Preparation of Unvulcanized Rubber Mixture (CMB) for Domain Formation

Respective materials shown in Table 1 were mixed in amounts compounded shown in Table 1 by use of a 6-L pressure kneader (trade name: TD6-15MDX, manufactured by Toshin Co., Ltd.), thereby obtaining CMB. The mixing conditions were as follows: a filling rate of 70% by vol, a blade rotation speed of 30 rpm and 20 minutes.

TABLE 1

| | Raw material name | Amount compounded (parts by mass) |
|---|---|---|
| Raw material rubber | Styrene/butadiene rubber (trade name: Tufdene 1000 manufactured by Asahi Kasei Corporation) | 100 |
| Electron electroconductive agent | Carbon black (trade name: Tokablack #5500 manufactured by Tokai Carbon Co., Ltd.) | 60 |
| Vulcanization promotion aid | Zinc oxide (trade name: Zinc Flower manufactured by Sakai Chemical Industry Co., Ltd.) | 5 |

TABLE 1-continued

| | Raw material name | Amount compounded (parts by mass) |
|---|---|---|
| Processing aid | Zinc stearate (trade name: SZ-2000, manufactured by Sakai Chemical Industry Co., Ltd.) | 2 |

2. Preparation of Rubber Mixture (MRC) for Matrix Formation

Respective materials shown in Table 2 were mixed in amounts compounded shown in Table 2 by use of a 6-L pressure kneader (trade name: TD6-15MDX, manufactured by Toshin Co., Ltd.), thereby obtaining MRC. The mixing conditions were as follows: a filling rate of 70% by vol, a blade rotation speed of 30 rpm and 16 minutes.

TABLE 2

| | Raw material name | Amount compounded (parts by mass) |
|---|---|---|
| Raw material rubber | Butyl rubber (trade name: JSR Butyl 065 manufactured by JSR Corporation) | 100 |
| Filler | Calcium carbonate (trade name: Nanox #30 manufactured by Maruo Calcium Co., Ltd.) | 70 |
| Vulcanization promotion aid | Zinc oxide (trade name: Zinc Flower manufactured by Sakai Chemical Industry Co., Ltd.) | 7 |
| Processing aid | Zinc stearate (trade name: SZ-2000, manufactured by Sakai Chemical Industry Co., Ltd.) | 2.8 |

3. Preparation of Unvulcanized Rubber Mixture for Forming Electroconductive Layer 1

CMB and MRC obtained above were mixed in amounts compounded shown in Table 3 by use of a 6-L pressure kneader (trade name: TD6-15MDX, manufactured by Toshin Co., Ltd.). The mixing conditions were as follows: a filling rate of 70% by vol, a blade rotation speed of 30 rpm and 16 minutes.

TABLE 3

| | Raw material name | Amount compounded (parts by mass) |
|---|---|---|
| Raw material rubber | Unvulcanized domain composition | 25 |
| Raw material rubber | Unvulcanized matrix composition | 75 |

4. Formation of Rubber Mixture for Forming Electroconductive Layer 1

Next, a vulcanizer and a vulcanization accelerator shown in Table 4 were added in amounts compounded shown in Table 4, based on 100 parts by mass of a mixture of CMB and MRC, and mixed by use of an open roll having a roll diameter of 12 inches, thereby preparing a rubber mixture for forming electroconductive layer 1. The mixing conditions were as follows: a rotation speed of a front roll, of 10 rpm, a rotation speed of a rear roll, of 8 rpm and a roll gap of 2 mm; turning right and left was performed twenty times in total and thereafter tight milling at a roll gap of 0.5 mm was performed ten times, thereby obtaining rubber mixture 1 for forming electroconductive layer 1. The volume resistivity of the matrix and the volume resistivity of the domains are described in Table 9.

TABLE 4

| | Raw material name | Amount compounded (parts by mass) |
|---|---|---|
| Vulcanizer | Sulfur (trade name: SULFAX PMC manufactured by Tsurumi Chemical Industry Co., Ltd.) | 3 |
| Vulcanization aid | Tetramethylthiuram disulfide (trade name: TT manufactured by Ouchi Shinko Chemical Industrial Co., Ltd.) | 3 |

5. Provision of Support 1 Having Electroconductive Outer Surface

A round bar having a total length of 252 mm and an outer diameter of 6 mm was provided where the surface of stainless steel (SUS304) as support 1 having an electroconductive outer surface was subjected to an electroless nickel plating treatment.

Formation of Electroconductive Layer 1

A die having an inner diameter of 10 mm was attached to the tip of a crosshead extruder including a mechanism for feeding support 1 and a mechanism for discharging an unvulcanized rubber roller, and the temperatures of the extruder and the crosshead were adjusted to 80° C. and the speed of conveying of support 1 was adjusted to 60 mm/sec. Rubber mixture 1 for forming electroconductive layer 1 was fed from the extruder under the conditions and the outer circumference portion of support 1 was covered with the rubber mixture for forming electroconductive layer 1 in the crosshead, thereby obtaining an unvulcanized rubber roller.

Next, the unvulcanized rubber roller was loaded into a hot-air vulcanization furnace at 160° C. and heated for 60 minutes, thereby vulcanizing the rubber mixture for forming electroconductive layer 1 and thus obtaining a roller where an electroconductive layer was formed on the outer circumference portion of the support. Thereafter, both end portions of electroconductive layer 1 were cut away by 10 mm and thus the length of one portion of electroconductive layer 1 in the longitudinal direction was 232 mm.

Finally, the surface of electroconductive layer 1 was polished by a grindstone. Thus, electroconductive member 1 was obtained which had a crown shape where each of the diameters at positions of 90 mm from the central portion toward both end portions was 8.4 mm and the diameter of the central portion was 8.5 mm.

<Production of Electroconductive Members 2 to 10>

Each of electroconductive members 2 to 10 was produced in the same manner as in production of electroconductive member 1 except that each unvulcanized matrix rubber composition and each unvulcanized domain composition were produced as shown in Table 8 by use of each material shown in Table 5 to Table 7 and were used to produce each rubber for forming an electroconductive member as shown in Table 9.

TABLE 5

| Material abbreviation | Material name | Product name | Manufacturer name |
|---|---|---|---|
| #7360 | Electroconductive carbon black | Tokablack #7360SB | Tokai Carbon Co., Ltd. |
| #5500 | Electroconductive carbon black | Tokablack #5500 | Tokai Carbon Co., Ltd. |
| Ketjen | Electroconductive carbon black | Ketjen black EC600JD | Lion Specialty Chemicals Co., Ltd. |
| LV70 | Quaternary ammonium salt | Adekacizer LV70 | Manufactured by ADEKA Corporation |

TABLE 6

| Material abbreviation | Material name | Trade name | Manufacturer name |
|---|---|---|---|
| Butyl | JSR Butyl 065 | Butyl rubber | JSR Butyl 065 | JSR Corporation |
| ECO | CG102 | Epichlorohydrin rubber | Epichlomer CG102 | Osaka Soda Co., Ltd. |
| EPDM | Esplene301A | Ethylene/propylene/diene rubber | Esprene301A | Sumitomo Chemical Corporation |
| EPDM | Esprene505A | Ethylene/propylene/diene rubber | Esprene505A | Sumitomo Chemical Corporation |
| NBR | N230SV | Acrylonitrile/butadiene rubber | JSR N230SV | JSR Corporation |
| NBR | N220S | Acrylonitrile/butadiene rubber | JSR N220S | JSR Corporation |
| SBR | T2003 | Styrene/butadiene rubber | Tufdene 2003 | Asahi Kasei Corporation |
| SBR | T1000 | Styrene/butadiene rubber | Tufdene 1000 | Asahi Kasei Corporation |

TABLE 7

| Material (abbreviation) | Material name | Trade name | Manufacturer name |
|---|---|---|---|
| Sulfur | Sulfur | SULFAX PMC | Tsurumi Chemical Industry Co., Ltd. |
| TT | Tetramethylthiuram disulfide | Nocceler TT-P | Ouchi Shinko Chemical Industrial Co., Ltd. |
| TBZTD | Tetrabenzylthiuram disulfide | Sanceler TBZTD | Sanshin Chemical Industry Co., Ltd. |
| TET | Tetraethylthiuram disulfide | Sanceler TET-G | Sanshin Chemical Industry Co., Ltd. |

TABLE 8

| Electroconductive member No. | Unvulcanized matrix rubber composition | | | | | Unvulcanized domain rubber composition | | | | | | |
|---|---|---|---|---|---|---|---|---|---|---|---|---|
| | Type of raw material rubber | | | Additive | | Type of raw material rubber | | | Electroconductive agent | | | |
| | First rubber in matrix | SP value | Mooney viscosity | Material abbreviation | parts by mass | Second rubber in domains | SP value | Mooney viscosity | Electron electroconductive agent in domains | parts by mass | DBP | Dispersion time min | Mooney viscosity |
| 1 | Butyl J5R065 | 15.8 | 32 | | | SBR T1000 | 16.8 | 45 | CB #5500 | 60 | 155 | 20 | 92 |
| 2 | EPDM Esprene505A | 16 | 47 | | | NBR N230SV | 19.2 | 32 | CB #7360 | 70 | 87 | 20 | 90 |
| 3 | Butyl JSR065 | 15.8 | 32 | | | EPDM Esprene505A | 16 | 47 | CB #5500 | 65 | 155 | 20 | 94 |
| 4 | EPDM Esprene505A | 16 | 47 | | | NBR N230SV | 19.2 | 32 | CB #7360 | 70 | 87 | 20 | 90 |
| 5 | SBR T2003 | 17 | 33 | #7360 | 30 | NBR N230SV | 19.2 | 32 | CB #7360 | 70 | 87 | 20 | 90 |
| 6 | EPDM Esprene505A | 16 | 47 | | | NBR N220S | 20.4 | 57 | CB #7360 | 70 | 87 | 20 | 90 |
| 7 | Butyl JSR065 | 15.8 | 32 | | | EPDM Esprene301A | 16 | 47 | CB #5500 | 65 | 155 | 20 | 92 |
| 8 | EPDM Esprene505A | 16 | 47 | | | NBR N220S | 20.4 | 57 | CB #7360 | 60 | 87 | 20 | 86 |
| 9 | SBR T2003 | 17 | 33 | | | NBR N230SV | 19.2 | 32 | CB #7360 | 70 | 87 | 20 | 90 |
| 10 | ECO CG102 | 18.5 | 52 | LV | 3 | NBR N230SV | 19.2 | 32 | Ketjen B EC600JD | 15 | 360 | 20 | 60 |

TABLE 9

| Electroconductive member No. | Makeup of unvulcanized rubber | | Dispersion of unvulcanized rubber | | Vulcanization | | | | Electric characteristics | | | Fine structure | | |
|---|---|---|---|---|---|---|---|---|---|---|---|---|---|---|
| | Domains, parts by mass | Matrix, parts by mass | Rotation speed (rpm) | Kneading time (min) | Vulcanizer | | accelerator | | Volume resistivity of matrix $\rho M$ ($\Omega \cdot cm$) | Volume resistivity of domains $\rho D$ ($\Omega \cdot cm$) | $\rho M/\rho D$ | Sea-island structure | Equivalent circle diameter Sd of domains (μm) | Distance between domains (μm) |
| | | | | | Material abbreviation | parts by mass | Material abbreviation | parts by mass | | | | | | |
| 1 | 25 | 75 | 30 | 16 | Sulfur | 3 | TT | 3 | $7.13 \times 10^{16}$ | $2.59 \times 10^{01}$ | $2.75 \times 10^{15}$ | Presence | 0.22 | 0.21 |
| 2 | 25 | 75 | 30 | 16 | Sulfur | 3 | TET | 3 | $8.08 \times 10^{15}$ | $7.03 \times 10^{01}$ | $1.15 \times 10^{14}$ | Presence | 4.90 | 5.10 |
| 3 | 25 | 75 | 30 | 16 | Sulfur | 3 | TT | 3 | $7.16 \times 10^{16}$ | $2.59 \times 10^{01}$ | $2.76 \times 10^{15}$ | Presence | 0.26 | 0.17 |
| 4 | 25 | 75 | 30 | 16 | Sulfur | 3 | TET | 3 | $6.27 \times 10^{15}$ | $5.76 \times 10^{01}$ | $1.09 \times 10^{14}$ | Presence | 4.23 | 6.10 |
| 5 | 25 | 75 | 30 | 16 | Sulfur | 3 | TBZTD | 1 | $1.87 \times 10^{07}$ | $2.55 \times 10^{01}$ | $7.32 \times 10^{05}$ | Presence | 2.20 | 2.30 |
| 6 | 25 | 75 | 30 | 16 | Sulfur | 3 | TET | 3 | $6.27 \times 10^{15}$ | $5.76 \times 10^{01}$ | $1.09 \times 10^{14}$ | Presence | 4.93 | 5.60 |
| 7 | 25 | 75 | 30 | 16 | Sulfur | 3 | TET | 3 | $7.16 \times 10^{16}$ | $2.59 \times 10^{01}$ | $2.76 \times 10^{15}$ | Presence | 0.09 | 0.20 |
| 8 | 25 | 75 | 15 | 5 | Sulfur | 3 | TET | 3 | $6.21 \times 10^{15}$ | $5.87 \times 10^{01}$ | $1.06 \times 10^{14}$ | Presence | 6.80 | 5.65 |
| 9 | 25 | 75 | 30 | 16 | Sulfur | 3 | TBZTD | 1 | $2.11 \times 10^{12}$ | $3.22 \times 10^{01}$ | $6.55 \times 10^{10}$ | Presence | 2.01 | 2.22 |
| 10 | 25 | 75 | 30 | 16 | Sulfur | 3 | TBZTD | 1 | $1.44 \times 10^{07}$ | $2.40 \times 10^{02}$ | $5.99 \times 10^{04}$ | Presence | 1.32 | 1.25 |

<Evaluation>

[1] Confirmation of Matrix-Domain Structure

Whether or not a matrix-domain structure was formed in the electroconductive layer was confirmed by the following method.

A section (thickness: 500 μm) was cut out with a razor in the longitudinal direction of the electroconductive layer of the electroconductive member such that a perpendicular cross section could be observed. Next, platinum vapor deposition was performed and imaging was made with a scanning electron microscope (SEM) (trade name: S-4800 manufactured by Hitachi High-Tech Corporation) 1,000 times, thereby obtaining a cross-section image.

Figure 2:
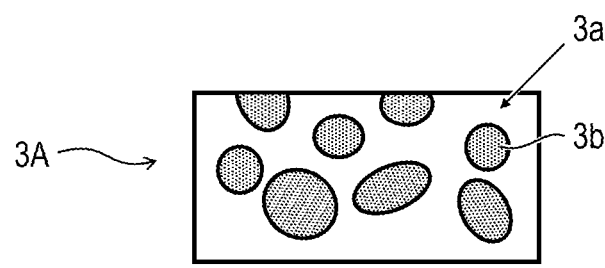
FIG. 2 illustrates a cross-sectional view of the electroconductive layer 1 in a direction perpendicular to a longitudinal direction of an electroconductive roller.

In one embodiment, a matrix-domain structure observed in the section from the electroconductive layer exhibited a state where a plurality of domains 3b were dispersed in matrix 3a and the domains were not connected and were independent from each other in the cross-section image as in FIG. 2. On the other hand, the matrix was communicated in the image and the domains were divided by the matrix.

In order to quantitatively determine the cross-section image taken, the cross-section image obtained by observation with SEM was converted into 8-bit grayscale by use of image treatment software (trade name: ImageProPlus manufactured by Media Cybernetics Inc.) and a monochrome image with 256 levels was obtained. Next, white and black in the image were subjected to inversion processing such that an image corresponding to the domains in the cross-section was whitened, and thereafter the threshold in binarization was set with respect to the brightness distribution of the image based on the algorithm of the Otsu's discriminant analysis method, thereby obtaining a binarized image.

The percentage K by number of the domains which were not connected and were independent from each other relative to the total number of domains which were present in a region of 50 μm square and which had no contact points at the frame borders of the binarized image was calculated as described above by the counting function of the binarized image.

Specifically, setting was made such that no domain having a contact point was counted at the frame borders on end portions in four directions of the binarized image in the counting function of the image treatment software.

The arithmetic average value (% by number) with respect to K was calculated which was determined by producing the section at each of 20 points in total from each any one in regions obtained by uniform division of the electroconductive layer of the electroconductive member (electroconductive roller) into fifths in the longitudinal direction and into quarters in the circumferential direction, and performing the above measurement.

A case where the arithmetic average value (% by number) with respect to K was 80 or more was defined as "Presence" of the matrix-domain structure and a case where the arithmetic average value (% by number) with respect to K was below 80 was defined as "Absence" thereof.

[2] Measurement of Volume Resistivity Rcm of Matrix

The volume resistivity Rcm of the matrix included in the electroconductive layer was measured as described below.

A scanning probe microscope (SPM) (trade name: Q-Scope250, manufactured by Quesant Instrument Corporation) was operated in a contact mode.

First, an ultrathin section having a thickness of 1 μm was cut out from the electroconductive layer of the electroconductive member (electroconductive roller) at a cutting temperature of −100° C. by use of a microtome (trade name: Leica EM FCS, manufactured by Leica Microsystems GmbH).

Such cutting out of the ultrathin section was performed in a direction perpendicular to the longitudinal direction of the electroconductive member in consideration of the direction in which charge was transported for discharging.

Next, the ultrathin section was placed on a metal plate in an environment of a temperature of 23° C. and a humidity of 50% RH, some locations among locations in direct contact with the metal plate were selected, any location corresponding to the matrix was contacted with a cantilever of SPM and a voltage of 50 V was applied to the cantilever for 5 seconds to measure the current value and thus calculate the arithmetic average value in 5 seconds.

The surface shape of the section subjected to the measurement with the SPM was observed and the thickness at each measurement location was calculated from the resulting height profile. Furthermore, the area of a depressed portion in a contact portion of the cantilever was calculated from the observation result of the surface shape. The volume resistivity was calculated from the thickness and the area of the depressed portion, and defined as the volume resistivity of the matrix.

The electroconductive layer of the electroconductive member (electroconductive roller) was uniformly divided into fifths in the longitudinal direction and into quarters in the circumferential direction and the section was produced from each of 20 points in total with respect to each any one in respective regions and subjected to the above measurement. The arithmetic average value was defined as the volume resistivity Rcm of the matrix.

[3] Measurement of Volume Resistivity Rcd of Domains

The volume resistivity Rcd of the domains was measured by the same method as the above measurement of the volume resistivity Rcm of the matrix except that the measurement was performed at any locations corresponding to the domains of the ultrathin section and the voltage of the measurement was 1 V.

[4] Equivalent Circle Diameter Sd of Domains, Observed from Outer Surface of Electroconductive Layer The equivalent circle diameter Sd of the domains was measured as follows.

A sample including the outer surface of the electroconductive layer was cut out, with a microtome (trade name: Leica EM FCS, manufactured by Leica Microsystems GmbH), from each of three locations at the center of the electroconductive layer in the longitudinal direction and at L/4 from both ends of the electroconductive layer toward the center under the assumption that the length of the electroconductive layer in the longitudinal direction was defined as L. The thickness of the sample was 1 μm.

Platinum was vapor-deposited on a surface of the sample, corresponding to the outer surface of the electroconductive layer. Any three points on the surface of the sample, where platinum was vapor-deposited, were selected and imaged with a scanning electron microscope (SEM) (trade name: S-4800 manufactured by Hitachi High-Tech Corporation) 5000 times. The resulting images taken of 9 sheets in total were binarized with image treatment software (trade name: ImageProPlus manufactured by Media Cybernetics Inc.) and subjected to quantitative determination with the counting function, and thus the arithmetic average value Ss of the plane areas of the domains included in each of the images taken was calculated. Next, the equivalent circle diameters ($=(4S/\pi)^{0.5}$) of the domains were calculated from the arithmetic average value Ss of the plane areas of the domains, as calculated with respect to each of the images taken. Next, the arithmetic average value of the equivalent circle diameters of the domains in each of the images taken was calculated, thereby obtaining the equivalent circle diameter Sd of the domains in observation of the electroconductive member as a measurement subject from the outer surface thereof.

[5] Method for Measuring SP Value

The SP value can be calculated at a high accuracy by creating a calibration curve by use of a material having a known SP value. The known SP value here used can also be any value in the catalog from the manufacturer of the material. For example, NBR and SBR do not depend on the molecular weights, and the SP values are substantially determined by the content ratio between acrylonitrile and styrene. Accordingly, the SP values of the rubber constituting the matrix and the rubber constituting the domains can be each calculated from the calibration curve obtained from the material having a known SP value, by analyzing the content rate of acrylonitrile or styrene by use of an analysis procedure such as pyrolysis gas chromatography (Py-GC) and solid state NMR. The SP value of isoprene rubber is determined depending on the structure of any isomer such as 1,2-polyisoprene, 1,3-polyisoprene, 3,4-polyisoprene, cis-1,4-polyisoprene and trans-1,4-polyisoprene. Accordingly, the SP value can be calculated with the material having a known SP value, by analyzing the content rate of any isomer by Py-GC, solid state NMR and/or the like as in SBR and NBR.

[6] Method for Measuring Mooney Viscosity ML (1+4)

The viscosities of the rubber mixture for domain formation and the rubber mixture for matrix formation can be each obtained by measuring the Mooney viscosity ML (1+4) based on JIS K6300-1:2013 at the rubber temperature in kneading.

[Production of Electrophotographic Photosensitive Member]

<Support>

An aluminum cylinder (JIS-A3003, aluminum alloy) having a diameter of 24 mm and a length of 257.5 mm was adopted as the support.

<Electroconductive Layer>

Next, the following materials were provided.

| | |
|---|---|
| Titanium oxide ($TiO_2$) particle (average primary particle size: 230 nm) covered with oxygen-deficient tin oxide ($SnO_2$) as metal oxide particle | 214 parts |
| Phenol resin (monomer/oligomer of phenol resin) (trade name: Plyophen J-325 manufactured by DIC Corporation, resin solid content: 60% by mass) as binding material | 132 parts |
| 1-Methoxy-2-propanol as solvent | 98 parts |

The materials were placed in a sand mill with 450 parts of glass beads each having a diameter of 0.8 mm and a dispersing treatment was performed under conditions of a rotation speed of 2000 rpm, a dispersing treatment time of 4.5 hours and a set temperature of cooling water of 18° C., thereby obtaining a dispersion liquid. The glass beads were removed from the dispersion liquid by use of a mesh (aperture: 150 μm).

A surface roughening material was added to the dispersion liquid in an amount of 10% by mass based on the total mass of the metal oxide particle and the binding material in the dispersion liquid from which the glass beads were removed. The surface roughening material here used was a silicone resin particle (trade name: Tospearl 120 manufactured by Momentive Performance Materials, average particle size: 2 μm).

A silicone oil (trade name: SH28PA manufactured by Dow Corning Toray Co., Ltd.) as a leveling agent was added to the dispersion liquid in an amount of 0.01% by mass based on the total mass of the metal oxide particle and the binding material in the dispersion liquid.

Next, a mixed solvent (mass ratio 1:1) of methanol and 1-methoxy-2-propanol was added to the dispersion liquid such that the total mass (namely, mass of solid content) of the metal oxide particle, the binding material and the surface roughening material in the dispersion liquid was 67% by mass relative to the mass of the dispersion liquid. The resultant was stirred to thereby prepare a coating liquid for an electroconductive layer of a photosensitive member.

The support was dip coated with the coating liquid for an electroconductive layer of a photosensitive member and heated at 140° C. for 1 hour, thereby forming an electroconductive layer of a photosensitive member, having a thickness of 30 μm.

<Undercoat Layer>

Next, the following materials were provided.

With 100 parts of a rutile type titanium oxide particle (trade name: MT-600B, average primary particle size: 50 nm, manufactured by TAYCA) was mixed and stirred 500 parts of toluene, 4.5 parts of vinyltrimethoxysilane (trade name: KBM-1003 manufactured by Shin-Etsu Chemical Co., Ltd.) was added thereto and the resulting mixture was stirred for 8 hours. Thereafter, toluene was distilled off by evaporation under reduced pressure and the resultant was dried at 120° C. for 3 hours, thereby obtaining a rutile type titanium oxide particle surface-treated with vinyltrimethoxysilane.

To a mixed solvent of 90 parts of methanol and 60 parts of 1-butanol were added 18 parts of the rutile type titanium oxide particle surface-treated with vinyltrimethoxysilane, 4.5 parts of N-methoxymethylated nylon (trade name: Tresin EF-30T manufactured by Nagase ChemteX Corporation) and 1.5 parts of a copolymerized nylon resin (trade name: Amilan CM8000 manufactured by Toray Industries, Inc.), thereby preparing a dispersion liquid.

The dispersion liquid was prepared to a dispersing treatment in a vertical sand mill with glass beads each having a diameter of 1.0 mm for 5 hours, thereby adjusting a coating liquid for an undercoat layer. Electroconductive layer 2 was dip coated with the coating liquid for an undercoat layer and the resulting coating film was dried at 100° C. for 10 minutes, thereby forming an undercoat layer having a thickness of 2.0 μm.

<Charge Generation Layer>

Next, the following materials were provided.

| | |
|---|---|
| Hydroxy gallium phthalocyanine of crystal form having peaks at positions of 7.5° and 28.4° in chart obtained by CuKα characteristic X-ray diffraction | 10 parts |
| Polyvinyl butyral resin (trade name: S-LEC BX-1 manufactured by Sekisui Chemical Co., Ltd.) | 5 parts |

The materials were added to 200 parts of cyclohexanone and dispersed by a sand mill apparatus with glass beads each having a diameter of 0.9 mm for 6 hours.

Thereto were further added 150 parts of cyclohexanone and 350 parts of ethyl acetate and the resultant was diluted, thereby obtaining a coating liquid for a charge generation layer. The undercoat layer was dip coated with the resulting coating liquid and dried at 95° C. for 10 minutes, thereby forming a charge generation layer having a thickness of 0.20 μm.

X-ray diffraction measurement was performed under the following conditions.

(Powder X-Ray Diffraction Measurement)

Measurement machine used: X-ray diffraction apparatus RINT-TTRII manufactured by Rigaku Corporation X-ray tube: Cu Voltage of tube: 50 KV Current of tube: 300 mA Scanning method: 2θ/θ scanning Scanning speed: 4.0°/min Sampling interval: 0.02°

Start angle (2θ): 5.0°

Stop angle (2θ): 40.0°

Attachment: standard sample holder

Filter: not used

Incident monochromator: used

Counter monochromator: not used

Divergence slit: open

Divergence vertical restriction slit: 10.00 mm

Scattering slit: open

Light-receiving slit: open

Flat-plate monochromator: used

Counter: scintillation counter

<Charge Transport Layer>
Next, the following materials were provided.

| | |
|---|---|
| (4,4'-Dimethyl-4"-(β-phenylstyryl)triphenylamine) | 8 parts |
| Polycarbonate (trade name: Iupilon Z400 manufactured by Mitsubishi Engineering-Plastics Corporation) | 10 parts |
| Silicone oil (KF-54: manufactured by Shin-Etsu Chemical Co., Ltd.) | 0.04 parts |

The materials were dissolved in a mixed solvent of 64 parts of tetrahydrofuran/16 parts of toluene, thereby preparing a coating liquid for a charge transport layer. The charge generation layer was dip coated with the coating liquid for a charge transport layer, thereby forming a coating film, and the coating film was dried at 110° C. for 60 minutes, thereby forming a charge transport layer having a thickness of 20 μm.

<Protective Layer>
Preparation of coating liquids 1 to 6 for protective layers were performed under conditions described below.
Coating Liquid 1 for Protective Layer:

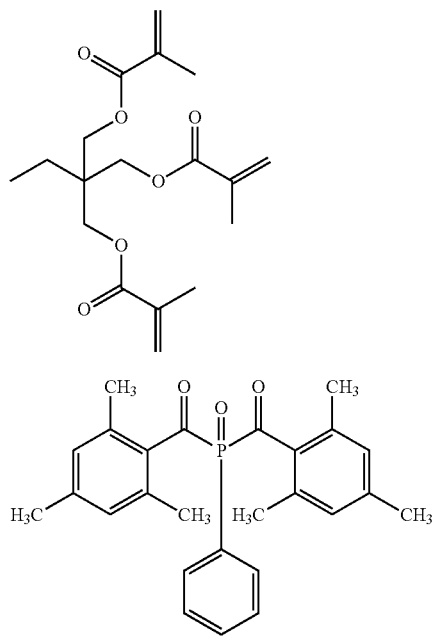

| | |
|---|---|
| Tin oxide particle (number average primary particle size 30 nm) having reactive acryloyl group | 27.4 parts |
| Curable monomer (the formula M) | 10.0 parts |
| Polymerization initiator (the formula I) | 1.0 part |

The materials were mixed with 40 parts of 1-propyl alcohol and the resulting mixture was stirred. Thus, coating liquid 1 for a protective layer was prepared.
Coating Liquid 2 for Protective Layer:

| | |
|---|---|
| Tin oxide particle (number average primary particle size 10 nm) having reactive acryloyl group | 8.0 parts |
| Curable monomer (M) | 10.0 parts |
| Polymerization initiator (I) | 1.0 part |

The materials were mixed with 40 parts of 1-propyl alcohol and the resulting mixture was stirred. Thus, coating liquid 2 for a protective layer was prepared.
Coating Liquid 3 for Protective Layer:

| | |
|---|---|
| Tin oxide particle (number average primary particle size 30 nm) having reactive acryloyl group | 4.0 parts |
| Curable monomer (M) | 10.0 parts |
| Polymerization initiator (I) | 1.0 part |

The materials were mixed with 40 parts of 1-propyl alcohol and the resulting mixture was stirred. Thus, coating liquid 3 for a protective layer was prepared.
Coating Liquid 4 for Protective Layer:

| | |
|---|---|
| Tin oxide particle (number average primary particle size 1 μm) having reactive acryloyl group | 27.4 parts |
| Curable monomer (M) | 10.0 parts |
| Polymerization initiator (I) | 1.0 part |

The materials were mixed with 40 parts of 1-propyl alcohol and the resulting mixture was stirred. Thus, coating liquid 4 for a protective layer was prepared.
Coating Liquid 5 for Protective Layer:

| | |
|---|---|
| Tin oxide particle (number average primary particle size 500 nm) having reactive acryloyl group | 27.4 parts |
| Curable monomer (M) | 10.0 parts |
| Polymerization initiator (I) | 1.0 part |

The materials were mixed with 40 parts of 1-propyl alcohol and the resulting mixture was stirred. Thus, coating liquid 5 for a protective layer was prepared.
Coating Liquid 6 for Protective Layer:

| | |
|---|---|
| Tin oxide particle (number average primary particle size 30 nm) having reactive acryloyl group | 8.0 parts |
| Curable monomer (M) | 10.0 parts |
| Polymerization initiator (I) | 1.0 part |

The materials were mixed with 40 parts of 1-propyl alcohol and the resulting mixture was stirred. Thus, coating liquid 6 for a protective layer was prepared.

Production of Protective Layer
Each photosensitive member where the charge transport layer and any layers thereunder were previously produced was coated with each of coating liquids 1 to 6 for protective layers by use of a circular slide hopper coating machine, thereby coating the charge transport layer with a protective layer. After such coating, the resultant was irradiated with ultraviolet light by use of a methyl halide lamp for 1 minute, thereby forming a protective layer having a dry thickness of 2.0 μm.

Figure 4:
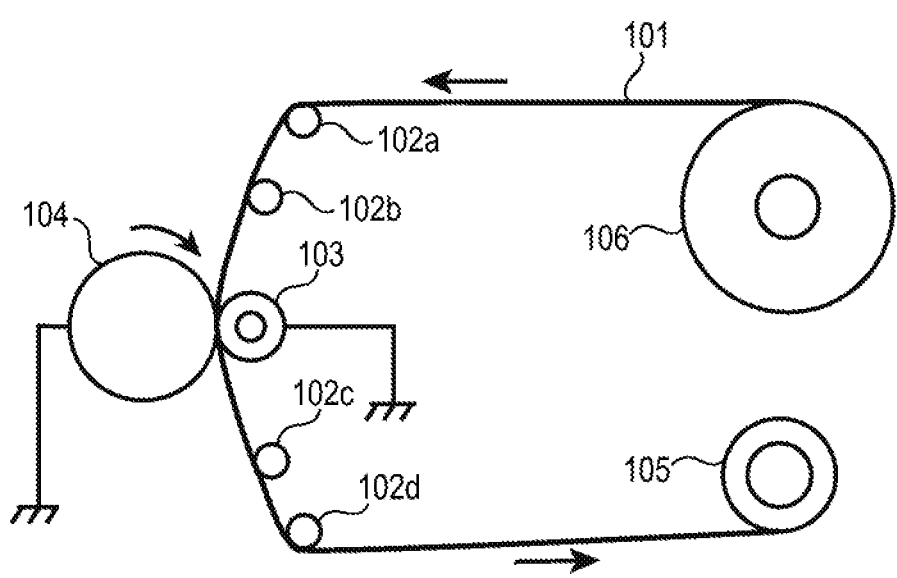
FIG. 4 illustrates one example of a schematic configuration of an apparatus for polishing an electrophotographic photosensitive member surface.

Next, a sheet-shaped rubbing member (rubbing sheet) was pressure welded to the surface of the electrophotographic photosensitive member produced above, according to the method illustrated in FIG. 4.

Thereafter, the surface of the electrophotographic photosensitive member and the rubbing sheet were relatively moved and thus rubbing of the protective layer was performed, thereby producing an electrophotographic photosensitive member. Herein, reference numeral 101 represents a rubbing sheet (sheet-shaped rubbing member), reference numerals 102*a*, 102*b*, 102*c* and 102*d* each represent a guide roller, reference numeral 103 represents a backup roller, reference numeral 104 represents an electrophotographic photosensitive member, reference numeral 105 represents a wind-up unit and reference numeral 106 represents a cylindrical shaft.

The rubbing conditions are represented below and shown in Tables.

Production was made as follows to thereby obtain each of photosensitive members No. 1 to 6.

Rubbing sheet: trade name: GC#4000 (manufactured by Ref-Lite)

Feeding speed of rubbing sheet: 500 mm/sec

Speed of rotation of electrophotographic photosensitive member: 150 rpm

Amount of entrance of rubbing sheet: 1.7 mm

Treatment time: 3 seconds

Measurement of maximum volume resistivity Rmax and minimum volume resistivity Rmin of protective layer surface The following measurement was performed in order to evaluate the volume resistivity of the protective layer surface. A scanning probe microscope (SPM) (trade name: Q-Scope250, manufactured by Quesant Instrument Corporation) was operated in a contact mode.

First, a section having a thickness of 1 µm was cut out from the protective layer surface at a cutting temperature of −100° C. by use of a microtome (trade name: Leica EM FCS, manufactured by Leica Microsystems GmbH).

Next, such an ultrathin section was placed on a metal plate in an environment of a temperature of 23° C. and a humidity of 50% RH so that the protective layer surface of the section was located upward, any location among locations in direct contact with the metal plate was selected and the range of 100×100 µm thereof was scanned. Five points high in current value and five points low in current value were selected therefrom, and a voltage of 50 V was applied to the cantilever for 5 seconds to measure the current value and thus calculate the arithmetic average value in 5 seconds.

The surface shape of the section subjected to the measurement with the SPM was observed and the thickness at each measurement location was calculated from the resulting height profile. Furthermore, the area of a depressed portion in a contact portion of the cantilever was calculated from the observation result of the surface shape. The volume resistivity was calculated from the thickness and the area of the depressed portion, and defined as the volume resistivity of the matrix.

The protective layer surface was uniformly divided into fifths in the longitudinal direction and into quarters in the circumferential direction, and such a section was produced from each of 20 points in total with respect to each any one in respective regions and subjected to the above measurement.

The average value with respect to the points low in current value and the average value with respect to the points high in current value, in the above measurement data, were determined as the maximum volume resistivity and the minimum volume resistivity, respectively, and the resistivity ratio was obtained. The results are shown in Table 10.

TABLE 10

| Photo-sensitive member No. | Number average primary particle size of oxidative metal particle [µm] | Volume ratio of oxidative metal particle in protective layer | Maximum volume resistivity Rmax/minimum volume resistivity Rmin of protective layer surface |
|---|---|---|---|
| 1 | 0.03 | 0.3 | $6.1 \times 10^7$ |
| 2 | 0.01 | 0.11 | $8.8 \times 10^3$ |
| 3 | 0.03 | 0.05 | $1.2 \times 10^7$ |
| 4 | 1 | 0.3 | $7.9 \times 10^9$ |
| 5 | 0.5 | 0.3 | $4.3 \times 10^8$ |
| 6 | 0.03 | 0.11 | $5.5 \times 10^5$ |

Evaluation with Electrophotographic Apparatus

Example 1 to 13 and Comparative Examples 1 to 3

A process cartridge where a charging member and a photosensitive member described in Table 11 were combined was mounted to an electrophotographic apparatus.

The electrophotographic apparatus here used was an altered version of a laser beam printer, trade name HP LaserJet Enterprise Color M553dn manufactured by Hewlett Packard Enterprise Development LP. Such alteration was made by attaching a feeding member of a fatty acid metal salt to the process cartridge. The fatty acid metal salt here used was zinc stearate. A position for such attachment was provided more upstream than the cleaning blade in the rotation direction of the photosensitive member. Such alteration was also made so that modulation and adjustment of the voltage applied to the charging roller and modulation and measurement of the amount of image exposure light could be made.

<Evaluation>

After the electrophotographic apparatus and the photosensitive member were first left to still stand in an environment of a temperature of 15° C. and a humidity of 10% RH for 48 hours or more, each photosensitive member in Examples and Comparative Examples was mounted to a cyan cartridge of the electrophotographic apparatus.

Next, the voltage applied was set so that the charge potential Vd of the photosensitive member was −700 V. Next, a solid image was output in a simple cyan color on A4-size plain paper and the amount of image exposure light was set so that the density on the paper with a spectral densitometer (trade name: X-Rite504 manufactured by X-Rite Inc.) was 1.45.

Next, image evaluation was performed. In a paper-feeding endurance test, outputting of a character image having a coverage rate of 1% in a simple cyan color on letter paper was performed for 10000 sheets by a printing operation in an intermittent mode. Thereafter, a toner for the present laser beam printer was supplied and such image outputting was performed for additional 10000 sheets (20000 sheets in total).

Samples for image evaluation (halftone image and solid white image) were each output on each one sheet upon the completion of such image outputting for 10000 sheets image and upon the completion of such image outputting for 20000 sheets. Each spot and stripe in the output image were visually observed and rated according to the following criteria.

Ranks were as follows.

Rank 5: the respective numbers of spots and stripes were 0

Rank 4: the number of spots was 1 to 2 and the number of stripes was 0

Rank 3: the number of spots was 3 and the number of stripes was 0

Rank 2: the number of spots was 4 to 6 or the number of stripes was 1

Rank 1: the number of spots was 7 or more or the number of stripes was 2 or more The image evaluation was performed with respect to each of five sheet samples obtained, and the average value was defined as the evaluation result. The evaluation results are shown in Table 7.

TABLE 11

| Charging member No. | Photosensitive member No. | Volume resistivity of matrix/Volume resistivity of domains in electroconductive member | Sd/Sm | Evaluation result |
|---|---|---|---|---|
| Example 1 | 1 | 1 | $2.8 \times 10^{15}$ | 7.3 | 5 |
| Example 2 | 1 | 6 | $2.8 \times 10^{15}$ | 7.3 | 5 |
| Example 3 | 2 | 5 | $1.1 \times 10^{14}$ | 9.8 | 5 |
| Example 4 | 6 | 5 | $1.1 \times 10^{14}$ | 9.9 | 5 |
| Example 5 | 9 | 1 | $6.6 \times 10^{10}$ | 67.0 | 5 |
| Example 6 | 3 | 1 | $2.8 \times 10^{15}$ | 8.7 | 4.8 |
| Example 7 | 4 | 5 | $1.1 \times 10^{14}$ | 8.5 | 4.6 |
| Example 8 | 7 | 1 | $2.8 \times 10^{15}$ | 3.0 | 4.2 |
| Example 9 | 8 | 5 | $1.1 \times 10^{14}$ | 13.6 | 4.4 |
| Example 10 | 5 | 1 | $7.3 \times 10^{05}$ | 73.3 | 3.8 |
| Example 11 | 1 | 2 | $2.8 \times 10^{15}$ | 22.0 | 4.6 |
| Example 12 | 1 | 3 | $2.8 \times 10^{15}$ | 7.3 | 4.4 |
| Example 13 | 2 | 4 | $1.1 \times 10^{14}$ | 4.9 | 4 |
| Comparative Example 1 | 10 | 1 | $6.0 \times 10^{04}$ | 44.0 | 1.2 |
| Comparative Example 2 | 1 | 5 | $2.8 \times 10^{15}$ | 0.4 | 1 |
| Comparative Example 3 | 6 | 1 | $1.1 \times 10^{14}$ | 164.3 | 1.2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-191563, filed Oct. 18, 2019, which is hereby incorporated by reference herein in its entirety.

What is claimed is:

1. A process cartridge detachably attachable to an electrophotographic apparatus body, comprising:
    an electrophotographic photosensitive member comprising a support, a photosensitive layer and a protective layer in this order, the protective layer comprising a metal oxide particle; and
    a charging member comprising a support having an electroconductive outer surface, and an electroconductive layer provided on the outer surface of the support;
    the electroconductive layer having a matrix comprising a first rubber with a plurality of domains dispersed in the matrix, the domains comprising a second rubber and an electron electroconductive agent,
    at least some of the domains being exposed on an outer surface of the charging member, the outer surface of the charging member comprising the matrix and at least some of the domains, wherein
    Rcm is at least $1.0 \times 10^5$ times Rcd when Rcm is a volume resistivity of the matrix and Rcd is a volume resistivity of the domains, and
    0.5<Sd/Sm<100 when Sm is a number average primary particle size of the metal oxide particle and Sd is an average value of equivalent circle diameters of the domains as observed from the outer surface of the charging member.

2. The process cartridge according to claim 1, wherein Sm is 0.01 to 0.50 μm.

3. The process cartridge according to claim 1, wherein a maximum volume resistivity of a surface of the protective layer is at least $10^4$ times a minimum volume resistivity of the surface of the protective layer.

4. The process cartridge according to claim 1, wherein the volume resistivity of the matrix in the charging member is greater than $1.0 \times 10^{12}$ Ω·cm.

5. The process cartridge according to claim 1, wherein Sd is 0.10 to 5.00 μm.

6. The process cartridge according to claim 1, wherein a distance Dm between wall surfaces of the domains is 0.15 to 6.00 μm observed from the outer surface of the charging member.

7. An electrophotographic apparatus comprising an electrophotographic photosensitive member and a charging member configured to charge the electrophotographic photosensitive member,
    the charging member comprising a support having an electroconductive outer surface, and an electroconductive layer provided on the outer surface of the support;
    the electroconductive layer having a matrix comprising a first rubber with a plurality of domains dispersed in the matrix, the domains comprising a second rubber and an electron electroconductive agent,
    at least some of the domains being exposed on an outer surface of the charging member, the outer surface of the charging member comprising the matrix and at least some of the domains, wherein
    Rcm is at least $1.0 \times 10^5$ times Rcd when Rcm is a volume resistivity of the matrix and Rcd is a volume resistivity of the domains, and
    0.5<Sd/Sm<100 when Sm is a number average primary particle size of the metal oxide particle and Sd is an average value of equivalent circle diameters of the domains as observed from the outer surface of the charging member.

8. The electrophotographic apparatus according to claim 7, comprising a lubricant feeding unit configured to retain lubricant and to feed the lubricant to an outer surface of the electrophotographic photosensitive member.

* * * * *